United States Patent
Vogel et al.

(10) Patent No.: US 10,352,181 B2
(45) Date of Patent: Jul. 16, 2019

(54) LEADING EDGE COOLING CHANNEL FOR AIRFOIL

(71) Applicant: ANSALDO ENERGIA IP UK LIMITED, London (GB)

(72) Inventors: Gregory Vogel, Palm Beach Gardens, FL (US); Elena P. Pizano, Golden, CO (US); Jeremy Metternich, Wellington, FL (US); Edwin J. Kawecki, Jupiter, FL (US)

(73) Assignee: ANSALDO ENERGIA IP UK LIMITED (GB)

( * ) Notice: Subject to any disclaimer, the term of this patent is extended or adjusted under 35 U.S.C. 154(b) by 212 days.

(21) Appl. No.: 14/951,146

(22) Filed: Nov. 24, 2015

(65) Prior Publication Data
US 2016/0146017 A1 May 26, 2016

Related U.S. Application Data

(60) Provisional application No. 62/084,810, filed on Nov. 26, 2014.

(51) Int. Cl.
*F01D 5/18* (2006.01)
*F01D 9/04* (2006.01)
(Continued)

(52) U.S. Cl.
CPC ............ *F01D 9/041* (2013.01); *B22F 3/1055* (2013.01); *B22F 5/04* (2013.01); *F01D 5/186* (2013.01); *F01D 25/12* (2013.01); *F05D 2240/12* (2013.01); *F05D 2240/30* (2013.01); *F05D 2240/303* (2013.01); *F05D 2250/182* (2013.01);
(Continued)

(58) Field of Classification Search
CPC . F01D 5/147; F01D 5/18; F01D 5/186; F01D 5/182; F01D 5/183; F01D 5/184; F01D 5/187; F01D 5/188; F01D 25/12; F05D 2260/20; F05D 2260/203; F05D 2260/204; F05D 2260/2212; F05D 2260/22141; F05D 2260/941
See application file for complete search history.

(56) References Cited

U.S. PATENT DOCUMENTS 3,540,811 A    11/1970   Davis
3,698,834 A    10/1972   Meginnis
(Continued)

FOREIGN PATENT DOCUMENTS

EP        1586739 A2    10/2005

OTHER PUBLICATIONS

International Search Report with Written Opinion dated Feb. 2, 2016 in PCT Application No. PCT/US2015/062647, 11 pages.
(Continued)

*Primary Examiner* — Jason D Shanske
*Assistant Examiner* — Sang K Kim
(74) *Attorney, Agent, or Firm* — Hovey Williams LLP

(57) ABSTRACT

Methods and systems of cooling airfoils are provided. The present invention provides systems and methods for providing cooling channels located within walls of a turbine airfoil. These cooling channels include micro-circuits that taper in various directions along the length and width of the airfoil. In addition, these cooling channels have a variety of shapes and areas to facilitate convective heat transfer between the surrounding air and the airfoil.

14 Claims, 16 Drawing Sheets

(51) Int. Cl.
  *F01D 25/12* (2006.01)
  *B22F 3/105* (2006.01)
  *B22F 5/04* (2006.01)

(52) U.S. Cl.
  CPC .. *F05D 2250/183* (2013.01); *F05D 2250/184* (2013.01); *F05D 2250/292* (2013.01); *F05D 2260/204* (2013.01); *Y02P 10/295* (2015.11)

(56) References Cited

U.S. PATENT DOCUMENTS

| | | | |
|---|---|---|---|
| 4,565,490 A | 1/1986 | Rice | |
| 5,326,224 A | 7/1994 | Lee et al. | |
| 5,688,104 A | 11/1997 | Beabout | |
| 5,704,763 A | 1/1998 | Lee | |
| 6,183,192 B1 | 2/2001 | Tressler et al. | |
| 6,254,334 B1 | 7/2001 | LaFleur | |
| 6,402,464 B1* | 6/2002 | Chiu | F01D 5/288 165/133 |
| 7,056,093 B2* | 6/2006 | Self | F01D 5/186 415/115 |
| 7,527,474 B1 | 5/2009 | Liang | |
| 7,857,589 B1 | 12/2010 | Liang | |
| 8,052,378 B2* | 11/2011 | Draper | F01D 5/186 415/115 |
| 8,083,485 B2* | 12/2011 | Chon | F01D 5/187 416/97 R |
| 8,961,133 B2* | 2/2015 | Kwon | F01D 5/186 415/115 |
| 2005/0169752 A1 | 8/2005 | Lee et al. | |
| 2005/0173388 A1 | 8/2005 | Lavers et al. | |
| 2005/0281673 A1 | 12/2005 | Draper et al. | |
| 2006/0107668 A1 | 5/2006 | Cunha et al. | |
| 2008/0240919 A1 | 10/2008 | Liang | |
| 2008/0279696 A1 | 11/2008 | Liang | |
| 2010/0054930 A1 | 3/2010 | Morrison | |
| 2013/0280091 A1 | 10/2013 | Propheter-Hinckley et al. | |
| 2014/0205454 A1 | 7/2014 | Giovannetti et al. | |
| 2014/0331641 A1 | 11/2014 | Reinert | |
| 2016/0201507 A1* | 7/2016 | Bunker | F01D 5/186 415/116 |

OTHER PUBLICATIONS

International Search Report with Written Opinion dated Mar. 2, 2016 in PCT Application No. PCT/US2015/062655, 9 pages.
International Search Report with Written Opinion dated Mar. 2, 2016 in PCT Application No. PCT/US2015/062652, 9 pages.
Extended European Search Report from Corresponding Application EP15862629.1 dated May 17, 2018 (9 pages).
Office Action dated Dec. 21, 2018 in Corresponding Chinese Patent Application No. 201580074633.X (10 pages).
English Translation of Office Action dated Dec. 21, 2018 in Corresponding Chinese Patent Application No. 201580074633.X (9 pages).
Office Action dated Apr. 24, 2019 in Corresponding European Patent Application No. 15 862 629.1 (5 pages).

* cited by examiner

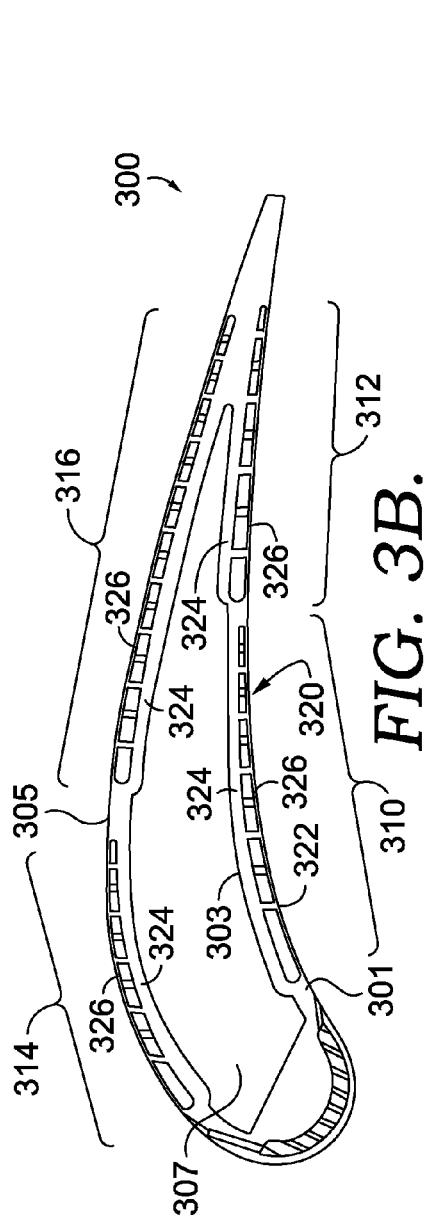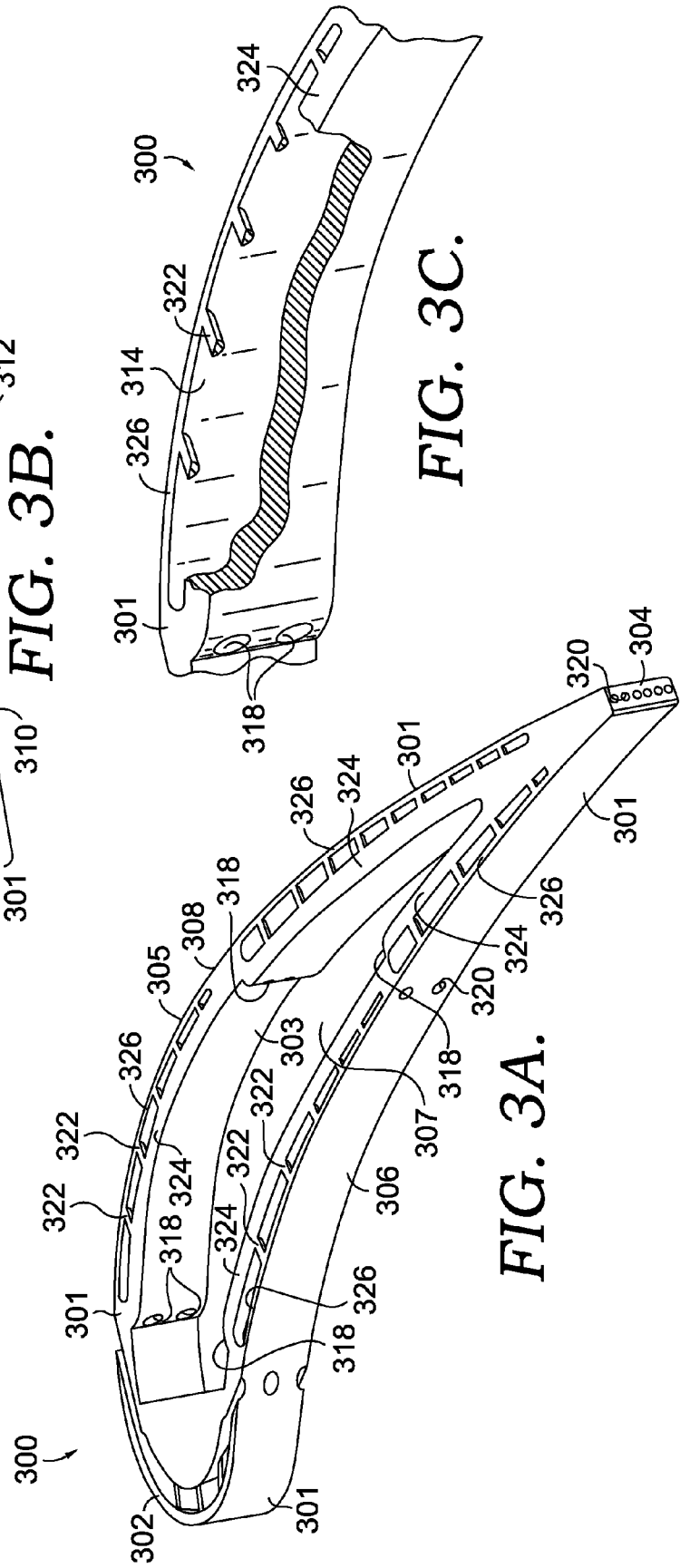

LEADING EDGE COOLING CHANNEL FOR AIRFOIL

CROSS-REFERENCE TO RELATED APPLICATIONS

This Application claims the benefit of U.S. Provisional Application No. 62/084,810, filed Nov. 26, 2014, and titled "GAS TURBINE AIRFOIL WITH TAPERED AIRFLOW MICRO CIRCUITS FOR IMPROVED COOLING," which is incorporated herein by reference in its entirety. This application is also related by subject matter to concurrently filed U.S. patent application Ser. No. (not yet assigned; Attorney Docket No. PSSF.241855), filed Nov. 24, 2015, and titled "TAPERED COOLING CHANNEL FOR AIRFOIL," and concurrently filed U.S. patent application Ser. No. (not yet assigned; Attorney Docket No. PSSF.241856), filed Nov. 24, 2015, and titled "COOLING CHANNEL FOR AIRFOIL WITH TAPERED POCKET." The teachings of each of these concurrently filed applications are also incorporated herein by reference in their entirety.

TECHNICAL FIELD

The present invention relates to turbine airfoils, and more particularly, to cooling circuits incorporated into turbine airfoils.

BACKGROUND OF THE INVENTION

A typical gas turbine engine is comprised of three main sections: a compressor section, a combustor section, and a turbine section. When in a standard operating cycle, the compressor section is used to pressurize air supplied to the combustor section. In the combustor section, a fuel is mixed with the pressurized air from the compressor section and is ignited in order to generate high temperature and high velocity combustion gases. These combustion gases then flow into a multiple stage turbine, where the high temperature gas flows through alternating rows of rotating and stationary gas turbine airfoils. The rows of stationary vanes are typically used to redirect the flow of combustion gases onto a subsequent stage of rotating blades. The turbine section is coupled to the compressor section along a common axial shaft, such that the turbine section drives the compressor section.

The air and hot combustion gases are directed through a turbine section by turbine blades and vanes. These blades and vanes are subject to extremely high operating temperatures, often exceeding the material capability from which the blades and vanes are made. Extreme temperatures can also cause thermal growth in the components, thermal stresses, and can lead to durability shortfall. In order to lower the effective operating temperature, the blades and vanes are cooled, often with air or steam. However, the cooling must occur in an effective way so as to use the cooling fluid efficiently. As a result, an improved cooling design for airfoils in gas turbines that addresses these issues, among others, is needed.

BRIEF SUMMARY OF THE INVENTION

In brief, and at a high level, the subject matter of this application relates generally to cooling passages, channels, and chambers incorporated into gas turbine airfoils. A gas turbine airfoil is comprised of an airfoil wall that includes an inner surface and an outer surface, and that forms an airfoil chamber that is at least partially enclosed by the airfoil wall. Embodiments provide for airfoil passages and pockets that are formed in various locations, directions, and configurations in the airfoil wall for improved cooling of the airfoil. The airfoil passages allow for cooling fluid or air to pass through the airfoil wall and airfoil chamber, cooling the airfoil during operation of the gas turbine.

In a first embodiment of the invention, an airfoil for a gas turbine having a leading edge and a trailing edge is provided. The airfoil comprises an airfoil wall having an inner surface and an outer surface, the airfoil wall forming an airfoil chamber at least partially enclosed within the airfoil wall, and a plurality of airfoil passages formed in the airfoil wall at the leading edge, each of the plurality of airfoil passages comprising a first opening in the outer surface, a second opening in the outer surface, and a channel extending from at least one of the first opening and the second opening within the airfoil wall to a third opening in the inner surface, the third opening providing fluid communication between the channel and the airfoil chamber.

In a second embodiment of the invention, a gas turbine assembly is provided. The assembly comprises a plurality of airfoils. Each of the plurality of airfoils comprises an airfoil wall having an inner surface and an outer surface, the airfoil wall forming an airfoil chamber at least partially enclosed within the airfoil wall, and an airfoil passage formed in a leading edge of the airfoil wall. The airfoil passage comprises a first opening in the outer surface, a second opening in the outer surface, and a channel extending from at least one of the first opening and the second opening within the airfoil wall to a third opening in the inner surface, the third opening providing fluid communication between the channel and the airfoil chamber. A third cross-sectional area of the channel proximate the third opening is greater than a cross-sectional area of the at least one of the first opening and the second opening from which the channel extends.

In a third embodiment of the invention, a method of manufacturing airfoils is provided. The method comprises providing an airfoil having an airfoil wall including an inner surface and an outer surface, the airfoil wall forming an airfoil chamber at least partially enclosed within the airfoil wall, and forming a plurality of airfoil passages within a leading edge of the airfoil wall, each of the plurality of airfoil passages comprising a first opening in the outer surface, a second opening in the outer surface, and a channel extending from at least one of the first opening and the second opening within the airfoil wall to a third opening in the inner surface, the third opening providing fluid communication between the channel and the airfoil chamber.

The cooling circuits, channels, passages, and/or microcircuits described in this disclosure are discussed frequently in the context of gas turbine airfoils, but may be used in any type of airfoil structure. Additionally, cooling fluid, gas, air, and/or airflow may be used interchangeably in this disclosure, and refer to any cooling medium that can be sent through an airfoil to provide heat transfer and cooling of the airfoil.

BRIEF DESCRIPTION OF THE SEVERAL VIEWS OF THE DRAWING

The present invention is described in detail below with reference to the attached drawing figures, wherein:

FIG. 3A is an angled, perspective, cross-sectional view of an airfoil with cooling channels, in accordance with an embodiment of the present invention;

FIG. 3B is a cross-sectional view of the airfoil shown in FIG. 3A, in accordance with an embodiment of the present invention;

FIG. 3C is a partial, cross-sectional, perspective view of a cooling pocket of the airfoil shown in FIGS. 3A and 3B, in accordance with an embodiment of the present invention;

DETAILED DESCRIPTION OF THE INVENTION

At a high level, the subject matter of this application generally relates to an airfoil for a gas turbine that includes cooling circuits integrated in various configurations. The airfoil may generally include an airfoil wall with an inner surface and an outer surface that at least partially encloses an airfoil chamber. Cooling circuits may be formed in various locations in the airfoil wall, to provide enhanced heat transfer from the airfoil when the gas turbine is in operation and cooling fluid or gas is passing through the cooling circuits. For turbine hardware operating in harsh environments, the use of this airfoil cooling technology is fully contemplated to be adapted to additional components such as outer and inner diameter platforms, blade outer or inner air shields, or alternative high temperature turbine components.

Figure 1A:
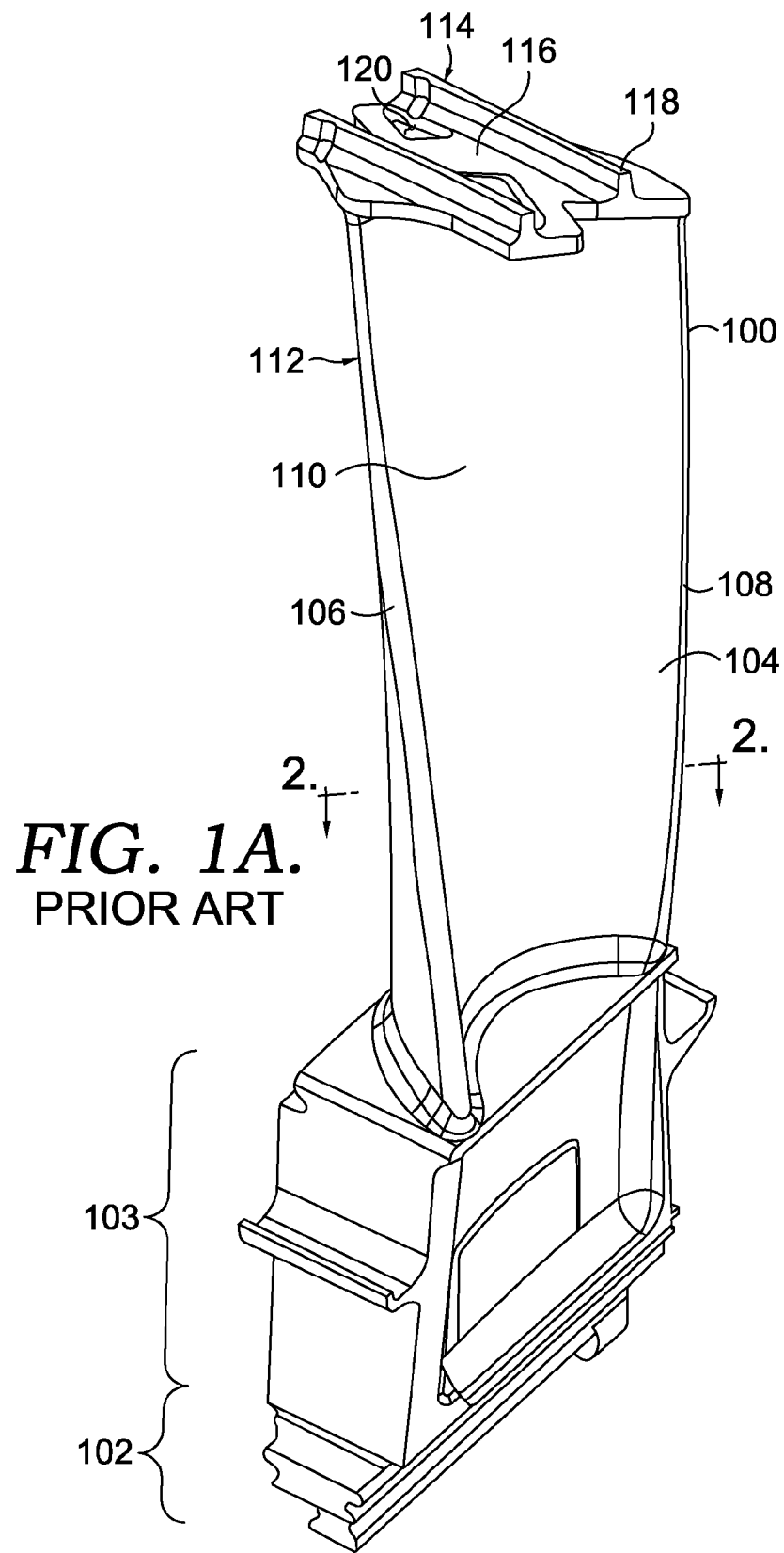
FIG. 1A is a perspective view of a prior art gas turbine airfoil.

Referring now to FIG. 1A, a gas turbine blade 100 is provided. The turbine blade 100 comprises a bottom portion commonly referred to as a root 102, which may be coupled to a rotor disk (not shown). It is understood that the root may be completely integrated into the rotor disk, such that the root does not extend into the flow path. Extending in an upward radial, typically perpendicular to the rotor central axis, direction from the root 102 is the neck 103. The neck 103 may primarily be used as a transitional piece between the root 102 and the gas turbine airfoil 104.

The gas turbine airfoil 104 is comprised of four distinct portions. The first portion of the airfoil 104 that comes into contact with pressurized gas flow is referred to as the leading edge 106, which is opposed by the last portion of the airfoil to come in contact with the gas flow, defined as the trailing edge 108. The leading edge 106 faces the turbine compressor section (not shown), or turbine inlet, along the rotor center axis. This direction is referred to as the axial direction. When pressurized airflow impedes upon the leading edge 106, the airflow splits into two separate streams of air with different relative pressures. Connecting the leading edge 106 and the trailing edge 108 are two radially extending walls, which are defined based on the relative pressures impeding on the walls. The concave surface seen in FIG. 1A is defined to be a pressure side wall 110. The concave geometry of this surface generates a higher local pressure along the length of the pressure side wall 110. Opposing the pressure side wall 110 is a suction side wall 112. The suction side wall 112 has a convex geometry, which generates a lower local pressure along the length of the suction side wall 112.

The pressure differential created between the pressure side wall 110 and the suction side wall 112 creates an upward lifting force along the cross-section of the gas turbine airfoil 104. The cross-section of the gas turbine airfoil 104 can be seen in greater detail in FIG. 2. This lifting force actuates the rotational motion of the rotor disk. The rotor disk may be coupled to a compressor and a generator via a shaft (not shown) for the purposes of generating electricity. The uppermost portion of FIG. 1A shows a tip shroud 114 containing a first surface 116 that is populated with knife edges 118 that extend radially outward from the first surface 116. Located between the knife edges 118 are recessed pockets 120.

Figure 1B:
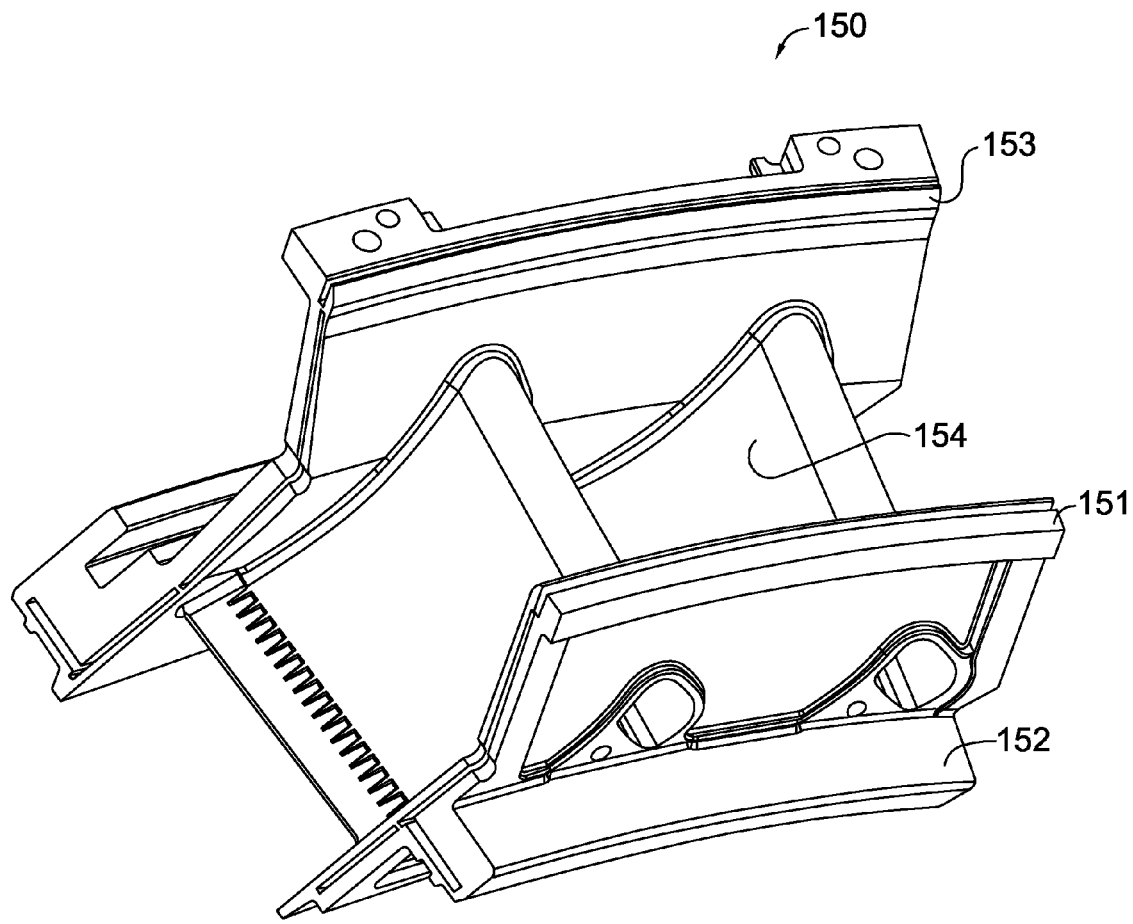
FIG. 1B is a perspective view of a prior art gas turbine vane.

A vane assembly 150 of the prior art is shown in FIG. 1B, and comprises an inner platform 151, inner rail 152, outer platform 153, and vane airfoils 154 extending between inner platform 151 and outer platform 153. While the inner rail 152 serves as a means to seal the rim cavity region from leakage of the cooling air into the hot gas path instead of passing to the designated vanes, inner rail 152 also stiffens inner platform 151. Inner rail 152 may be located proximate the plenum of cooling air and therefore operates at approximately the temperature of the cooling air.

Figure 2:
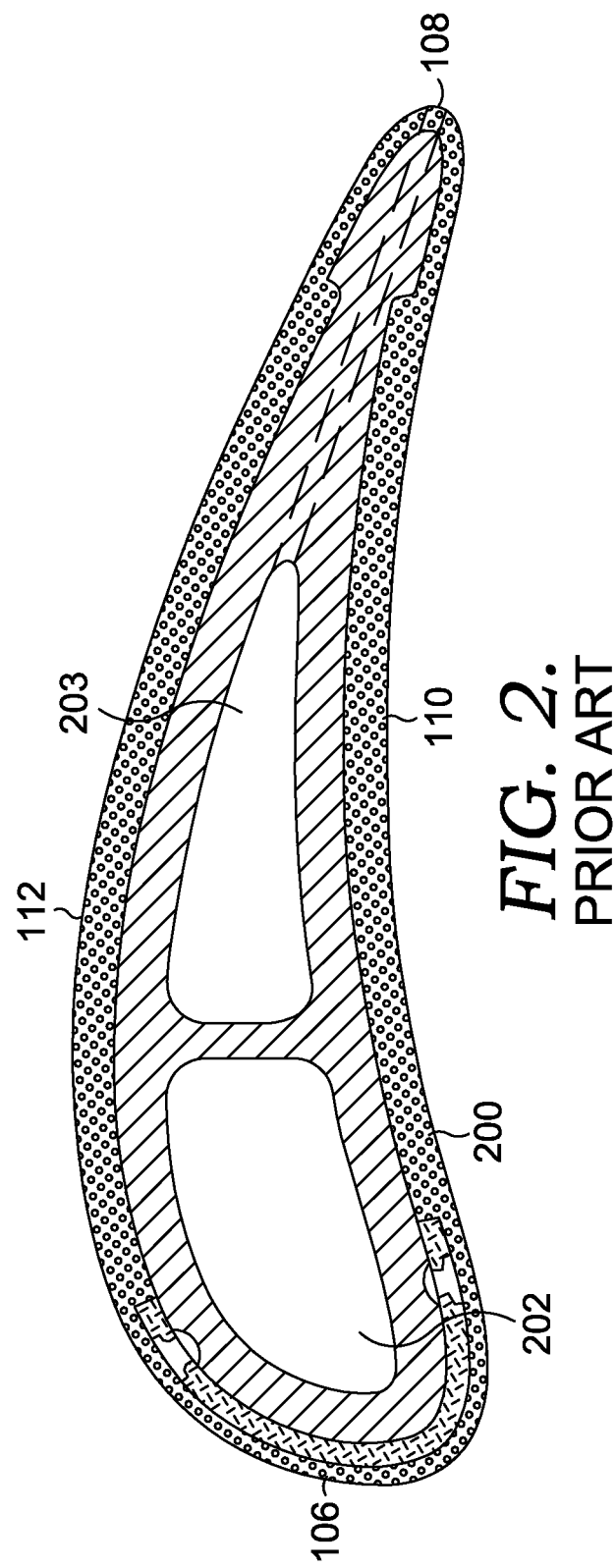
FIG. 2 is a cross-sectional view of the airfoil shown in FIG. 1A.

FIG. 2 is a cross-sectional view of a prior art cooling design for a gas turbine airfoil. FIG. 2 is cross-sectional for the purposes of showing cooling passages 202 and 203. Gas turbine airfoils may operate in an environment where temperatures exceed the melting point of the materials used to construct the airfoil. Therefore, cooling passages 202 and 203 are provided as a way to decrease the temperature of the airfoil during operation by flowing cooling air through the cooling passages of the airfoil.

Traditionally, air cooled turbine airfoils are produced by a machining process or an investment casting process by forming a wax body of the turbine airfoil, providing an outer shell about the wax part, and then melting the wax to leave a mold for the liquid metal. Then, liquid metal is poured into the mold to fill the void left by the wax. Often-times the wax also contains a ceramic core to establish cooling channels within the metal turbine airfoils. Once the liquid metal cools and solidifies, the shell is removed and the ceramic core is chemically leached out of the now solid metal turbine airfoil, resulting in a hollow turbine airfoil. These traditional casting methods have limits as to the geometry that can be cast. New developments in additive manufacturing have occurred which can expand the capabilities beyond traditional investment casting techniques.

The turbine airfoils of FIGS. 1A, 1B, and 2 are known to be manufactured using standard metallurgy techniques, such as investment casting. However, the geometries that can be created using traditional manufacturing technique are limited. Internal geometrical shapes, as well as small geometrical intricacies, are generally not suitable for die casting. Advances in the field of additive manufacturing, have been adopted for the manufacturing of intricacies that were previously unattainable. The embodiments of the present invention may be created using an additive manufacturing process. An example of an additive manufacturing process is selective laser melting, known more commonly in the manufacturing field as SLM. Although SLM is widely considered a common additive manufacturing process, the embodiments described herein can be manufactured with any additive manufacturing process, such as selective laser sintering (SLS) or direct metal laser sintering (DMLS) or an alternative additive manufacturing method. The SLM processes described herein are intended to be non-limiting and exemplary.

FIGS. 3A and 3B are cross-sectional perspective views of an exemplary gas turbine airfoil 300 incorporating various cooling channels, in accordance with an embodiment of the present invention. The airfoil 300 includes an airfoil wall 301 having an inner surface 303 and an outer surface 305. The airfoil wall 301 at least partially encloses an airfoil chamber 307 within the airfoil wall 301. The airfoil wall 301 as a whole comprises a leading edge 302, a trailing edge 304, a pressure side wall 306, and a suction side wall 308. Positioned within the pressure side wall 306 are pockets 310 and 312. Pockets 314 and 316 are positioned within the suction side wall 308. These pockets 310, 312, 314 and 316 have been introduced into the airfoil wall 301 of the gas turbine airfoil 300 for the purpose of increasing active cooling within the airfoil 300 by allowing cooling fluid or gas to pass through interior portions of the airfoil wall 301 to carry heat away from the airfoil 300 during operation of an associated gas turbine to which the airfoil 300 is coupled.

Additionally, the pocket sections 310, 312, 314, and 316 (which are shown by the spaces within the airfoil wall 301) may be manufactured using an additive manufacturing process, as previously discussed. As shown in FIGS. 3A and 3B, pockets 310, 312, 314, and 316 each extend within the airfoil wall 301, and each include a first opening 318, which may be one of a plurality of first openings 318, referred to hereinafter as the first opening 318 for simplicity but intended to be non-limiting, (which may be a cooling fluid inlet) on the inner surface 303, and a second opening 320, which may be one of a plurality of second openings 320, referred to hereinafter as the second opening 320 for simplicity but intended to be non-limiting (which may be a cooling fluid outlet) on the outer surface 305. These openings 318, 320 are provided and paired for each of the pockets 310, 312, 314, and 316. The first opening 318 of each of the pockets 310, 312, 314 and 316 provides fluid communication between the airfoil chamber 307 and the respective pocket 310, 312, 314 or 316, and the second opening 320 provides fluid communication between the respective pockets 310, 312, 314 or 316 and an outside environment of the airfoil 300. These openings 318, 320 feed and exhaust the interior pockets 310, 312, 314, and 316 of the airfoil shown in FIGS. 3A-3C.

Included within each of the pockets 310, 312, 314, and 316 of the airfoil wall 301 are a plurality of pedestals 322, which extend between an inner pocket wall 324 and an outer pocket wall 326 of each of the pocket 310, 312, 314, and 316. The pockets 310, 312, 314, and 316 may each include one or more flow turbulators (not shown), which may be extruded portions of the pocket 310, 312, 314, or 316 that promote turbulent mixing of cooling fluid or gas, to provide further sidewall cooling. These can be implemented or included as various different structures or extrusions, simply to provide mixing of cooling fluid traveling between the respective first opening 318 and respective second opening 320 within the pockets 310, 312, 314, and 316. Turbulation may alternatively be achieved by manufacturing pockets having a rough surface. The topography of a surface with roughness is complex and there is no single definitive measure of roughness. A widely used basic perimeter is "equivalent roughness" (Ra), defined as the arithmetic average of the absolute values of the measured profile height deviations of the surface from the surface profile centerline within a given sampling length. Typical values of Ra for turbomachinery components are 125 micro-inches for material as cast and 25 micro-inches for polished components. In the disclosed embodiments, the pocket heat transfer coefficient may be additionally modified by tailoring the surface roughness to achieve an equivalent roughness measured value of at least 400 Ra.

The pockets 310, 312, 314, and 316 are included in an airfoil side wall and taper in an area generally along the axial direction from the leading edge 302 to the trailing edge 304. The taper is a reduction in cross-sectional area between the first opening 318 and second opening 320 of each respective pocket 310, 312, 314, and 316. The ratio of cross-sectional area difference between the first opening 318 and the second opening 320 of each of the pockets 310, 312, 314, and 316 may vary between 1.1:1 and 10:1, in order to accelerate the flow of cooling fluid traveling between the first opening 318 and the second opening 320 within each of the respective pockets 310, 312, 314, and 316. This results in a balance between the internal heat pick-up and heat transfer coefficient. In other words, as more heat is removed from the airfoil 300 through passage of the cooling fluid or gas through the respective pockets 310, 312, 314, and 316, the cooling fluid or gas becomes hotter and able to absorb less heat from the airfoil wall 301, and the acceleration of the cooling fluid or gas within the respective pockets 310, 312, 314, and 316 allows the cooling fluid or gas to at least partially maintain the desired heat transfer coefficient through the pockets 310, 312, 314, and 316. In this embodiment, the reduction in cross-sectional area tapers in an axial direction, as the reduction in cross-sectional area occurs in the direction of cooling passage flow between the first opening 318 and second opening 320 generally along the axis of the rotor disk (not shown).

In FIGS. 3A and 3B, the distance between the inner pocket wall 324 and outer pocket wall 326 may be larger proximate the leading edge 302 of the airfoil 300 and smaller proximate the trailing edge 304 of the airfoil 300. This internal passage differentiation may be further characterized by a ratio of pocket length (axial or radial) to airfoil wall width. The airfoil wall width is defined as the thickness between the inner surface 303 and the outer surface 305 of the airfoil 300. The pocket length, fully enclosed within the airfoil wall 301 in a generally axial direction, to airfoil wall width may be a minimum ratio of 1:1 to a maximum ratio dependent upon an airfoil span between the leading edge 302 and the trailing edge 304 of the airfoil 300. This minimum ratio may also be described as the pocket length to pocket width, defined as distance between the inner pocket wall 324 and the outer pocket wall 326 measured at the first opening 318, as a minimum ratio of 3:1.

Additionally, it is contemplated herein that each of the plurality of pedestals 322 in FIGS. 3A, 3B, and most clearly shown in FIG. 3C, may have a circular, triangular, square, ovular, or rectangular cross-sectional shape, among other shapes. Further, each of the plurality of pedestals 322 may have a non-uniform or varying cross-sectional area, for the purposes of creating optimal air flow characteristics within each pocket 310, 312, 314, and 316.

Also, in FIGS. 3A and 3B, pocket sections 310, 312, 314 and 316 may be arrayed in a linear or non-linear pattern within the airfoil wall 301, or rather, not aligned linearly along the airfoil wall 301. Further, the shape of the inner pocket wall 324 and the outer pocket wall 326 may be aligned substantially parallel to the inner surface 303 of airfoil wall 301 and/or the outer surface 305 of the airfoil wall 301. Additionally, it is contemplated that the second opening 320 may be positioned in the pressure side wall 306 or the suction side wall 308 of the airfoil 300 for each of the corresponding pockets 310, 312, 314, and 316. These pockets 310, 312, 314, and 316 may be radially arrayed and fully enclosed within the airfoil wall 301, having a pocket height in a radial direction to airfoil wall thickness at a minimum ratio of 1:1. Further, the positioning and structure of pockets 310, 312, 314, and 316 may be manufactured using additive manufacturing.

Figure 4A:
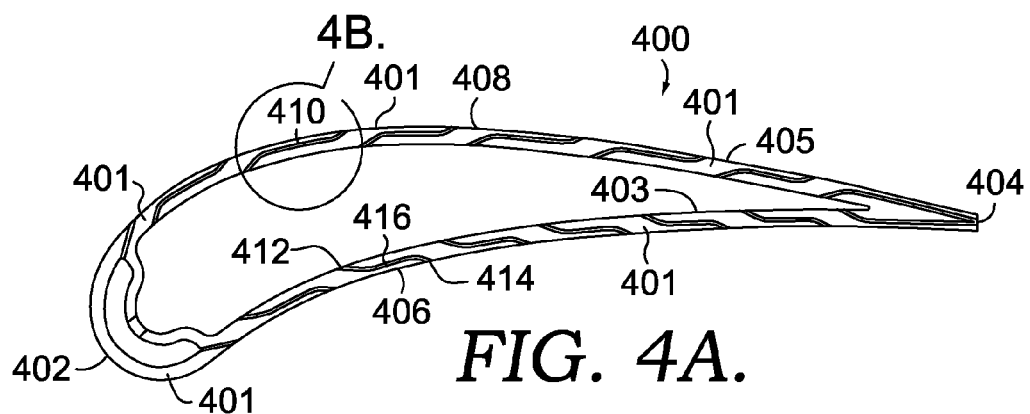
FIG. 4A is a cross-sectional view of an airfoil with a first configuration of cooling channels, in accordance with an embodiment of the present invention.

FIG. 4A is a cross-sectional view of an exemplary airfoil 400, in accordance with an embodiment of the present invention. In FIG. 4A, the airfoil 400 comprises an airfoil wall 401, a leading edge 402, an inner surface 403, a trailing edge 404, an outer surface 405, a pressure side wall 406, and a suction side wall 408. The airfoil 400 further includes a plurality of airfoil passages 410, which may allow cooling of the airfoil wall 401 when cooling fluid or gas passes through the airfoil passages 410.

Figure 4B:
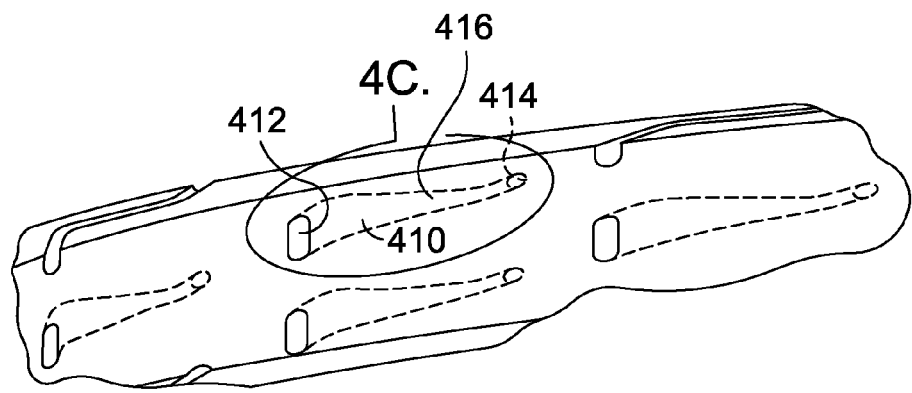
FIG. 4B is a partial, perspective, cross-sectional view of the airfoil shown in FIG. 4A, in accordance with an embodiment of the present invention.
Figure 4C:
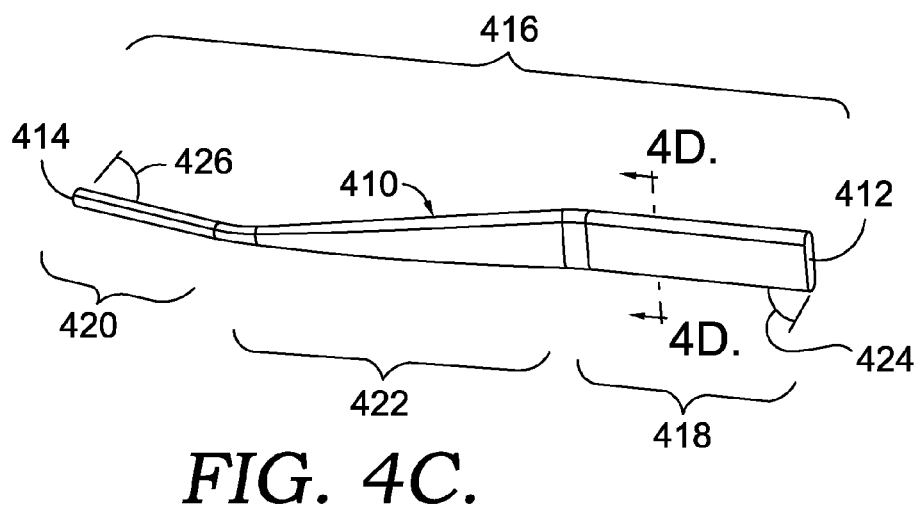
FIG. 4C is a perspective view of a radially tapering airfoil passage which can be formed into an airfoil wall, in accordance with an embodiment of the present invention.

In the exemplary airfoil 400, components of which are also shown in FIGS. 4B and 4C, the airfoil passages 410 extend from the inner surface 403 to the outer surface 405 of the airfoil wall 401 at various locations. The airfoil passages 410 in this embodiment allow cooling fluid or gas to enter a respective airfoil passage 410 at a first opening 412, which may be one of a plurality of first openings 412, referred to hereinafter as the first opening 412 for the sake of simplicity but intended to be non-limiting, and discharge the cooling fluid or gas from a second opening 414, which may be one of a plurality of second openings 414, referred to hereinafter as the second opening 414 for the sake of simplicity but intended to be non-limiting. A channel 416 extends from the first opening 412 to the second opening 414 within the airfoil wall 401.

Additionally, in FIGS. 4A and 4B, a cross-sectional area of the channel 416 changes between the first opening 412 and the second opening 414. The airfoil passage 410 in FIGS. 4A-4C includes a cross-sectional area change between the first opening 412 and the second opening 414 that is approximately four to one; however, it is contemplated that the cross-sectional area difference may vary from 1.1:1 to 10:1 between the first and the second opening 412, 414, or have another relative difference. The airfoil passage 410 in this airfoil 400 is generally described as tapering in a radial direction, as the reduction in area between the first opening 412 and the second opening 414 occurs in the direction of cooling fluid flow along the radius of the rotor disk (not shown).

FIG. 4C illustrates an enlarged perspective view of an airfoil passage 410 having the first opening 412 with a first cross-sectional area and the second opening 414 with a second cross-sectional area that is smaller than the first-cross-sectional area. Additionally, the channel 416 further comprises a first section 418 having the first cross-sectional area along its axial length, a second section 420 having the second cross-sectional area along its axial length, and a transitional section 422 having a cross-sectional area that tapers between the first cross-sectional area and the second cross-sectional area of the respective first and second sections 418, 420. The transitional section 422 may taper linearly or non-linearly along the length of the transitional section 422 (or any of the sections may taper). The second section 420 may further utilize a diffusion cooling hole to emit cooling fluid or gas from within the airfoil 400 at high velocity and cause the emitted cooling fluid or gas to wrap over the outer surface of the airfoil 400. This creates a thin, protective film layer of cooling fluid or gas between the outer surface 405 of the airfoil 400 and the high temperature combustion gases. A diffusion cooling hole may be utilized with the airfoil passage 410 described herein, and the resulting outward cross-sectional area difference of the second section 420 does not detract from the heat transfer coefficient benefits of a decreasing taper of the first section 418 and the transitional section 422 of the airfoil passage 410.

Cooling fluid or gas entering the first section 418 of the operating airfoil 400 may be relatively cool compared to the airfoil wall 401. However, as cooling fluid or gas travels from first section 418 to the transitional section 422 and to the second section 420, the cooling fluid or gas will gradually increase in temperature. Therefore, in order to provide a constant amount of heat transfer throughout the length of the channel 416, the cooling fluid or gas flow in the second section 420 should travel at a higher velocity than the cooling fluid or gas flow through the first section 418. As a result, the cross-sectional area of second section 420 is smaller than the cross-sectional area of first section 418 to increase the velocity of cooling fluid or gas traveling through the airfoil passage 410.

Additionally, as shown in FIG. 4C, a first angle 424 is formed between the first section 418 and a corresponding inner surface 403 of the airfoil wall 401 (as shown in FIG. 4A), and may be between 15 and 90 degrees, and a second angle 426 is formed between the second section 420 and the outer surface 405 of the airfoil wall 400 (as shown in FIG. 4A), which may be between 15 and 90 degrees. The taper of the transitional section 422 may generally occur in the radial direction of the airfoil wall 401. However, the channel 416 may extend and/or taper in a radial and/or an axial direction of airfoil wall 401, or in another direction. Further, in FIG. 4C, the first section 418, the second section 420, and the transitional section 422 are shown generally in linear axial alignment. Alternatively, first section 418, second section 420, and transitional section 422 may be arranged in non-linearly.

The transitional section 422 may be oriented generally parallel to the airfoil wall 401 and may be further characterized by a ratio of transitional section length to airfoil wall width. The airfoil wall width may be defined as the thickness between the inner surface 403 of the airfoil wall 401 and the outer surface 405 of the airfoil wall 401. The transitional section length, fully enclosed within an airfoil wall in a generally axial direction, to airfoil wall width may be a minimum ratio of 3:1 to a maximum ratio dependent upon an airfoil span between the leading edge 402 and the trailing edge 404 of the airfoil 400.

Figure 4D:
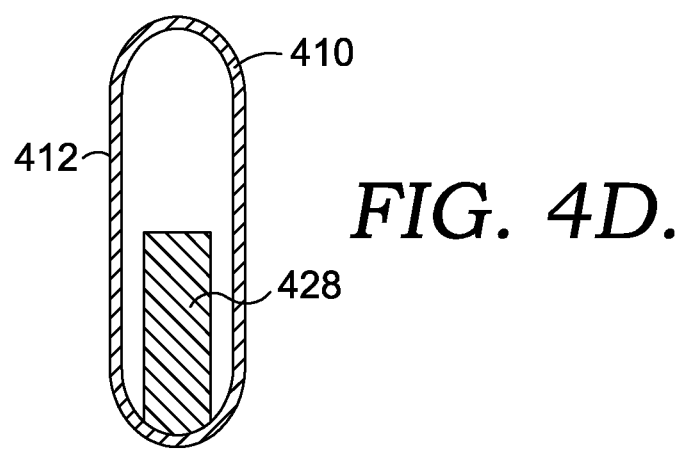
FIG. 4D is a cross-sectional view of the airfoil passage shown in FIG. 4C incorporated into an airfoil wall and including a flow turbulator, in accordance with an embodiment of the present invention.

FIG. 4D. is a cross-sectional, perspective view of the airfoil passage 410 incorporated into the airfoil 400 shown in FIGS. 4A and 4B, in accordance with an embodiment of the present invention. In FIG. 4D, airfoil passage 410 includes a flow turbulator 428 within the airfoil passage 410. The flow turbulator 428 is shown as having a rectangular cross-section, but it is contemplated that the flow turbulator 428 may have any uniform or non-uniform shape optimized for increasing the rate of convective heat transfer between the airfoil 400 and the flow of cooling fluid or gas. Additionally, the flow turbulator 428 may comprise a plurality of flow turbulators 428 that may be arrayed in a linear or non-linear pattern within the airfoil passage 410, or may be integrally manufactured with the airfoil passage 410 to have a rough surface. In the disclosed embodiments, the heat transfer coefficient of the airfoil passage 410 may be additionally modified by tailoring the surface roughness of the interior of the airfoil passage 410 to achieve an equivalent roughness value of at least 400 Ra.

Figure 5A:
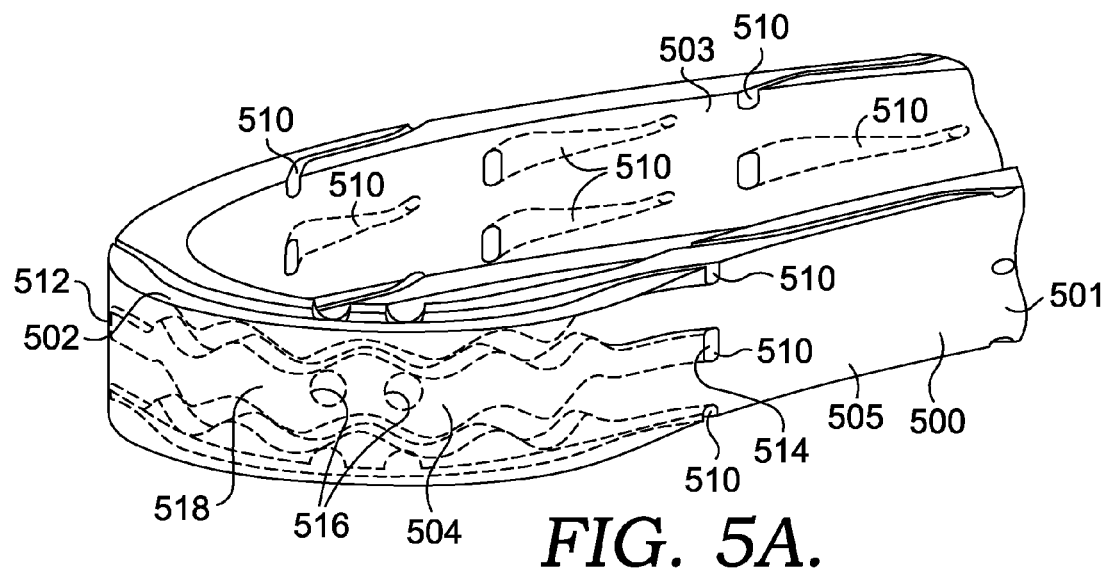
FIG. 5A is a perspective view of an airfoil having multiple cooling channels, in accordance with an embodiment of the present invention.

FIG. 5A is an angled, cross-sectional, perspective view of an airfoil 500 with variety of airfoil passages 510 integrated into an airfoil wall 501 of the airfoil 500, in accordance with an embodiment of the present invention. The airfoil 500 in FIG. 5A further comprises a leading edge airfoil passage 504 within the airfoil wall 501, which extends at least partially onto the sides of the airfoil 500.

The leading edge airfoil passage 504 includes at least one first opening 512 in the outer surface 505 of the airfoil wall 501, at least one second opening 514 in the outer surface 505 of the airfoil wall 501, and a channel 518 extending between the first opening 512 and the second opening 514 within the airfoil wall 501. The leading edge airfoil passage 504 further comprises at least one third opening 516 (which, in FIG. 5A, comprises two adjacent openings) in the inner surface 503 of the airfoil wall 501, which provides fluid communication between the channel 518 and an airfoil chamber 507 at least partially enclosed by the airfoil wall 501, through which cooling fluid or air may travel.

The cross-sectional area of the channel 518 is largest adjacent or proximate the third opening 516 at a third cross-sectional area 511 of the channel 518. The third opening 516, which may supply cooling fluid or gas from the airfoil chamber 507 to at least one of the first opening 512 and the second opening 514, and the third cross-sectional area 511 of the channel 518, is positioned proximate a stagnation region of high temperature corresponding to leading edge surface 502. This positioning of the third opening 516 within the channel 518, between first opening 512 and second opening 514 near the third cross-sectional area 511, allows the impingement effects of the third opening 516 to more effectively cool the airfoil wall 501.

The exemplary leading edge airfoil passage 504 may taper from the third cross-sectional area 511 axially and/or radially towards the first opening 512 and the second opening 514 within the leading edge 502 of the airfoil passage 504 in order to accelerate the flow of cooling fluid or gas passing through the leading edge airfoil passage 504. The leading edge airfoil passage 504 may be duplicated across the leading edge 502 of the airfoil 500 to provide enhanced cooling across the leading edge 502 of the airfoil 500 during operation of the gas turbine.

A first cross-sectional area of the first opening 512, which may be one of a plurality of first openings 512, referred to hereinafter as the first opening 512 for simplicity but intended to be non-limiting, of the leading edge airfoil passage 504 may be larger than a second cross-sectional area of the second opening 514, which may be one of a plurality of second openings 514, referred to hereinafter as the second opening 514 for simplicity but intended to be non-limiting, of the leading edge airfoil passage 504. The cross-sectional areas of the first opening 512 and second opening 514 are defined as the area between the walls of the channel at any position along the axial length of the channel. The leading edge airfoil passage 504 may be supplied with cooling fluid or gas from the airfoil chamber 507 through the third opening 516 in the inner surface 503 of the airfoil wall 501. The third opening 516, which may be one of a plurality of third openings 516, referred to hereinafter as the third opening 516 for simplicity but intended to be non-limiting, may further be referred to as an impingement hole. This cooling fluid or gas enters the airfoil wall 501 through the third opening 516, and then travels through the channel 518 towards the first opening 512 and the second opening 514 to exit the leading edge airfoil passage 504, carrying heat away from the airfoil wall 501.

The cross-sectional area of the channel 518 in the leading edge airfoil passage 504, as well as the other airfoil passages 510, may vary, linearly or non-linearly, across the length of channel 518, depending on the desired amount of heat transfer at different portions of the leading edge airfoil passage 504. In this respect, as shown in the leading edge airfoil passage 504, the cross-sectional area may be larger at the third cross-sectional area 511 of the channel 518 than at the first and second openings 512, 514, to allow acceleration of cooling fluid or gas between the third opening 516 and the first and second openings 512, 514 during cooling of the airfoil 500.

Figure 5B:
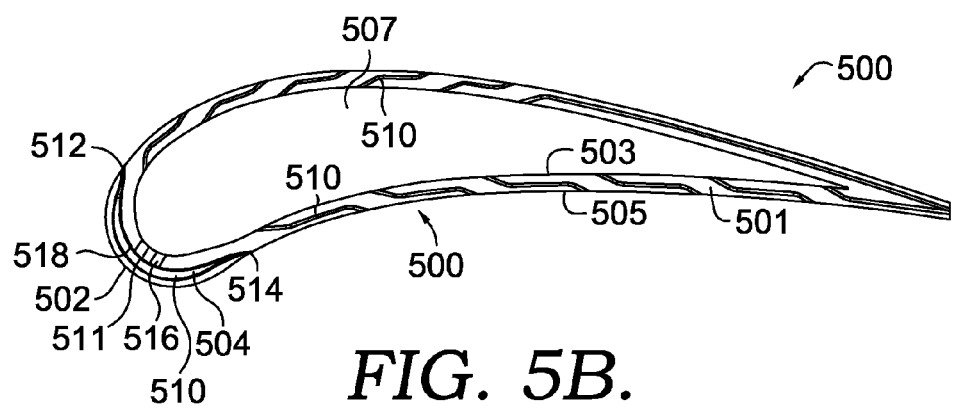
FIG. 5B is a cross-sectional, elevation view of the airfoil shown in FIG. 5A, in accordance with an embodiment of the present invention.

FIG. 5B is a cross-sectional, elevation view of the airfoil 500 of FIG. 5A showing the plurality of airfoil passages 510 integrated therein, in accordance with an embodiment of the present invention. In FIG. 5B, as discussed with respect to FIG. 5A, the leading edge airfoil passage 504, which may be repeated along the leading edge 502 of the airfoil 500, may be supplied with cooling fluid or gas from the airfoil chamber 507 through the third opening 516. This cooling fluid or gas travels through the leading edge 502 of the airfoil 500 by passing through the channel 518 to first opening 512 and second opening 514 to exit the airfoil wall 501, carrying heat away from the airfoil 500.

Figure 6:
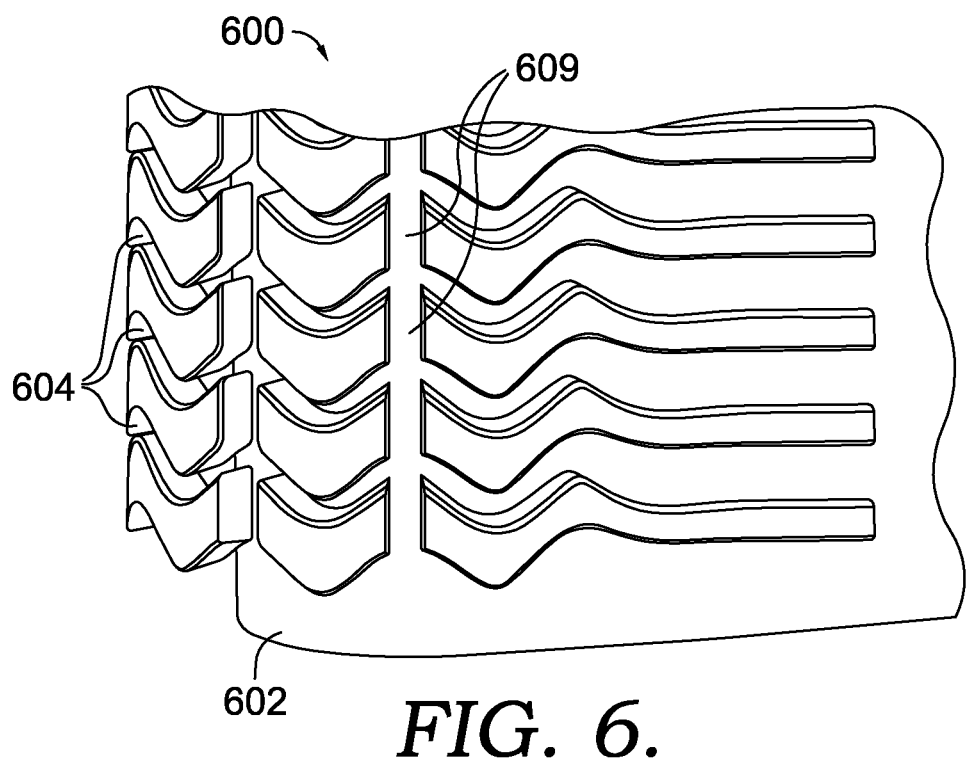
FIG. 6 is a partial, angled, perspective view of cooling channels incorporated into a leading edge of an airfoil, in accordance with an embodiment of the present invention.

FIG. 6 depicts a cut-out, perspective view of the geometry of a plurality of leading edge airfoil passages 604 integrated into an airfoil 600, in accordance with an embodiment of the present invention. FIG. 6 is used to representatively show the three-dimensional geometry of the leading edge airfoil passages 604 as they are arrayed on the leading edge 602 of the airfoil 600. Furthermore, the leading edge airfoil passages 604 are connected via a plurality of connecting passages 609. The connecting passages 609 provide fluid communication between each of the plurality of leading edge airfoil passages 604. The connecting passages 609 may be positioned at any location along leading edge 602, in order to provide the desired fluid communication between each of the plurality of leading edge airfoil passages 604. Additionally, connecting passages 609 may be any shape, cross-sectional area, or frequency across the plurality of leading edge airfoil passages 604.

Figure 7A:
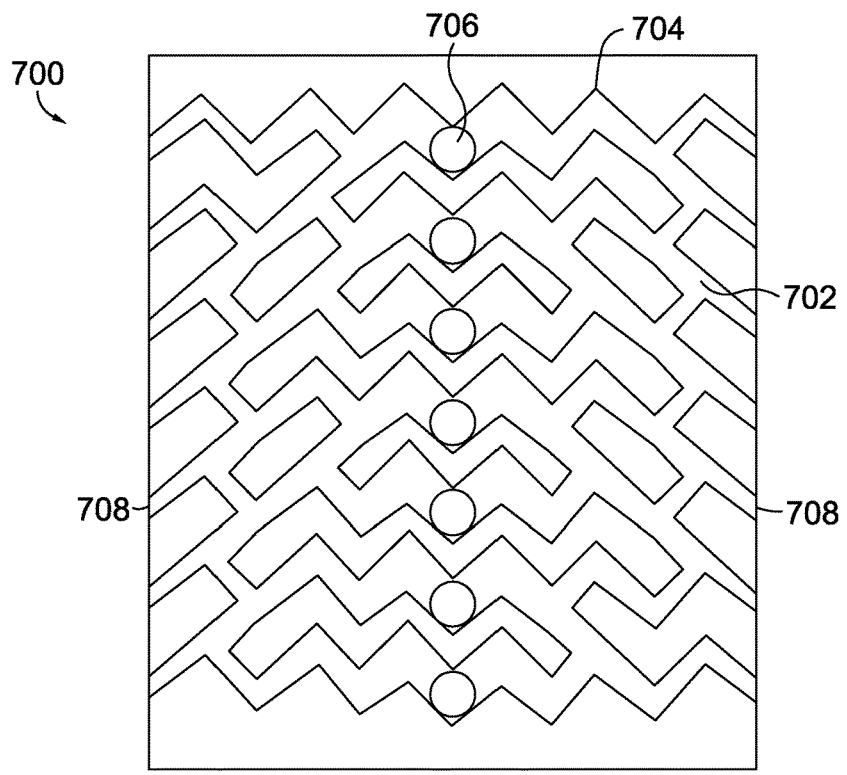
FIGS. 7A, 7B, and 7C are cut views of various cooling channel designs which can be incorporated into an airfoil, in accordance with embodiments of the present invention.
Figure 7B:
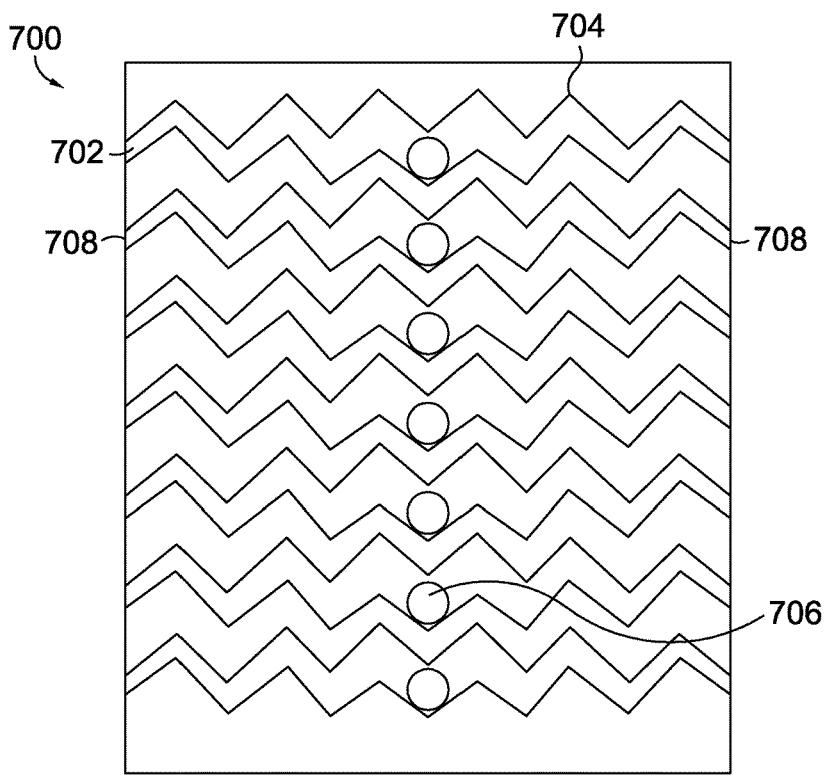
Figure 7C:
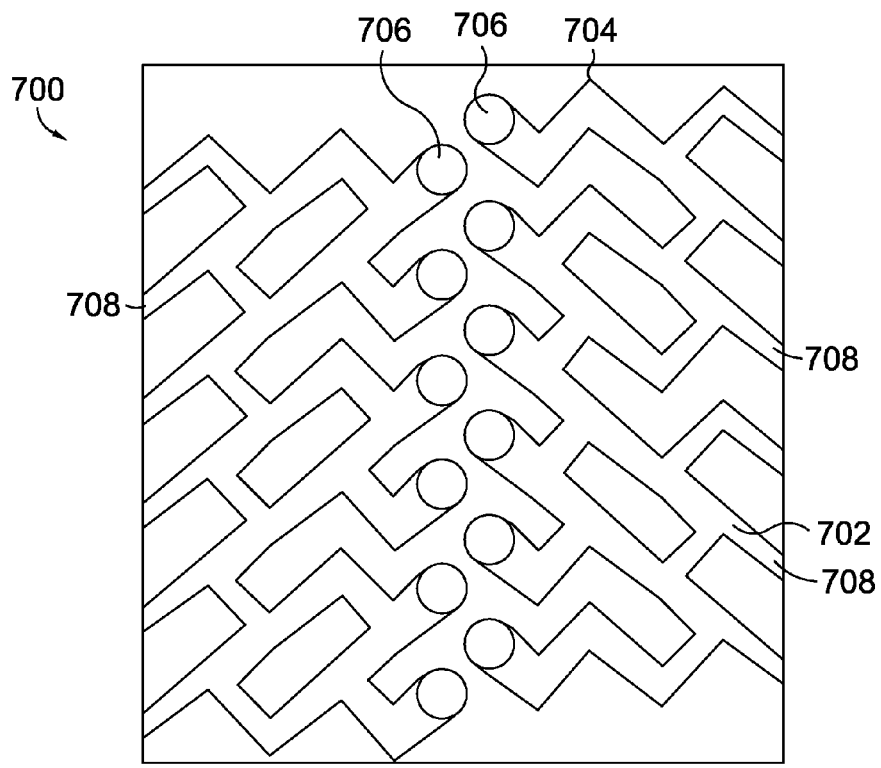

FIGS. 7A-10C depict a variety of airfoil passage geometries 700, 800, 900, 1000, 1010, and 1020 that can be integrated into an airfoil to provide enhanced cooling, in accordance with embodiments of the present invention. Referring now to FIGS. 7A-7C, a plurality of channels 702 having generally sharp-edged corners 704 are provided, in accordance with an embodiment of the present invention. The sharp-edged corners 704 are generally formed when two or more channels 702 having different angles intersect. Additionally, the intersections of channels 702 may be utilized to provide flow communication between the channels 702. Cooling fluid or gas may be supplied through the channels 702 via impingement holes 706. The cooling fluid or gas may then exit the channels 702 through openings 708 of the respective channels 702. As previously discussed, the channels 702 may vary in cross-sectional area to control a velocity of cooling fluid or gas passing through the channels 702.

Figure 8:
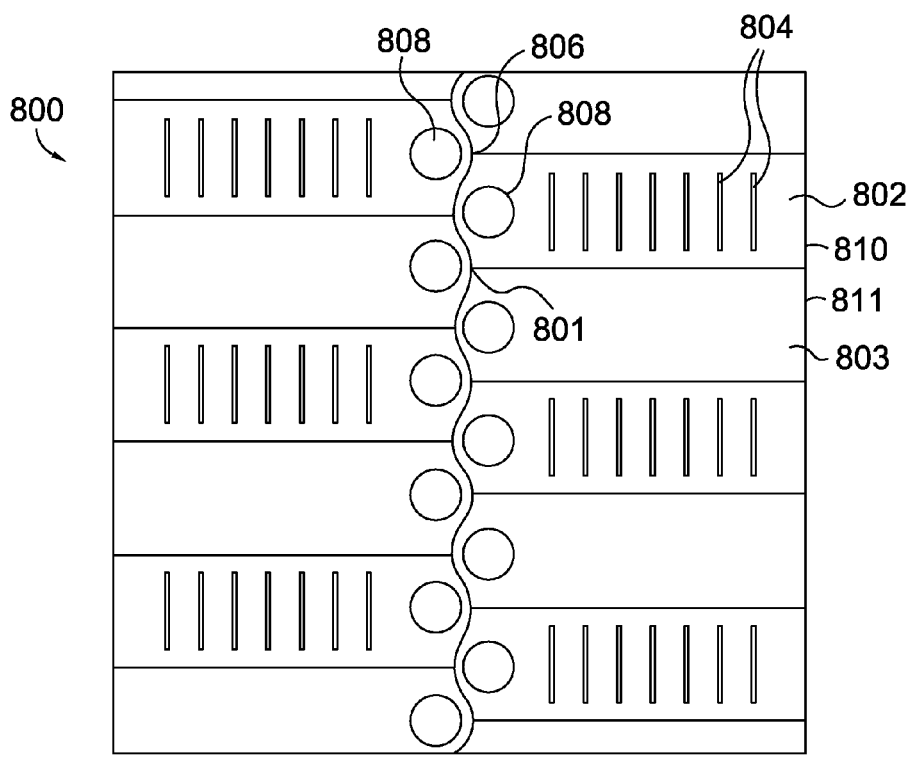
FIG. 8 is a cut view of an alternate cooling channel design, in accordance with an embodiment of the present invention.

FIG. 8 depicts a plurality of channels 802 and 803 in an alternate arrangement 800, in accordance with an embodiment of the present invention. In FIG. 8, cooling fluid or gas may be supplied to the channels 802 and 803, with the channels separated by a dividing portion 801. More specifically, the cooling fluid or air may be supplied to the channels 802 and 803 through a plurality of impingement holes 808, such that the cooling fluid or gas passes through the channels 802 and 803 towards respective first and second openings 810 and 811. In FIG. 8, a plurality of turbulators 804 are shown along the length of a side-wall 806 of the channels 802, 803. The plurality of turbulators 804 are shown in FIG. 8 as having a rectangular cross-sectional shape. However, it is contemplated that the plurality of turbulators 804 may have other cross-sectional shapes, including asymmetrical or non-uniform shapes, or integrally manufactured leading edges having a rough surface. In the disclosed embodiments, the leading edge channel heat transfer coefficient may be modified by additionally tailoring the surface roughness to achieve an equivalent roughness of at least 400 Ra.

As shown in FIG. 8, the plurality of turbulators 804 are arrayed in a parallel pattern along a length of the channel 802. However, the plurality of turbulators 804 may be patterned in a non-parallel pattern as well, in order to alter the fluid dynamics in the channels 802. For instance, the turbulators 804 may comprise multiple rows of turbulators. Additionally, each row of turbulators 804 may be angled with respect to the channel 802 (and any other channels 802, 803 into which it is integrated). Further, turbulators 804 may be positioned at any location within channels 802 and 803, and are not limited to a row configuration.

Figure 9A:
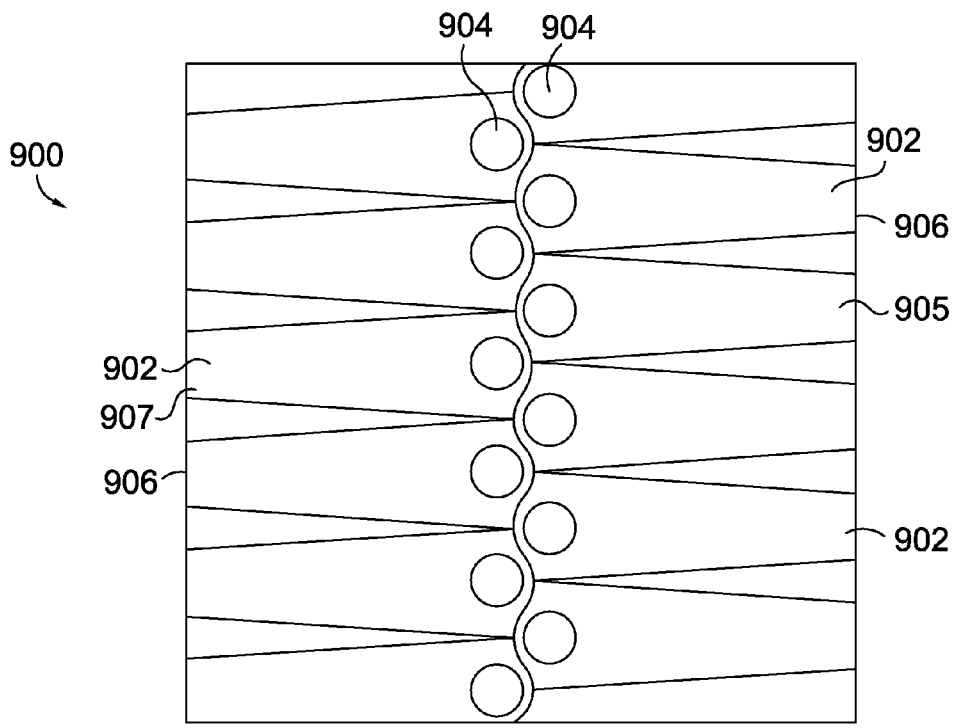
FIGS. 9A and 9B are cut views of alternate cooling channel designs, in accordance with embodiments of the present invention.
Figure 9B:
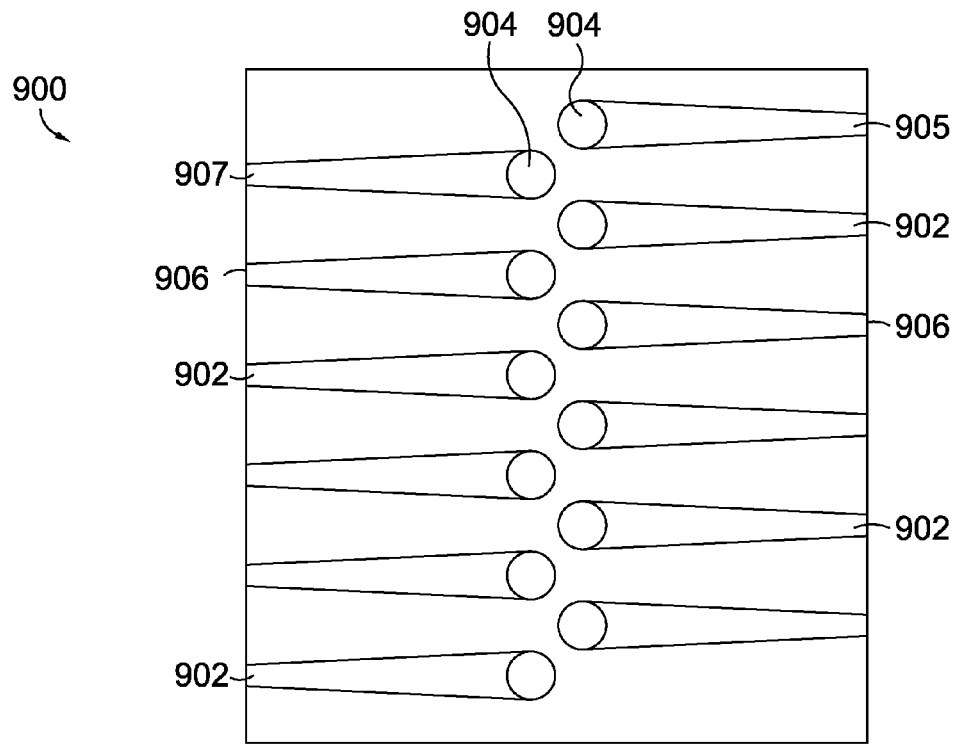

Referring now to FIGS. 9A and 9B, a plurality of tapered channels 902 in an alternate arrangement 900 which may be integrated into a leading edge of an airfoil is provided, in accordance with an embodiment of the present invention. In operation, cooling fluid or gas may be provided to the channels 902 through impingement holes 904 shown in FIGS. 9A and 9B. As cooling fluid or gas passes into the channels 902 from the impingement holes 904, the cooling fluid or gas accelerates towards respective first openings 905 and respective second openings 907 of the channels 902 along a side wall 906 due to the narrowing of the channels 902 towards the openings 905, 907.

Figure 10A:
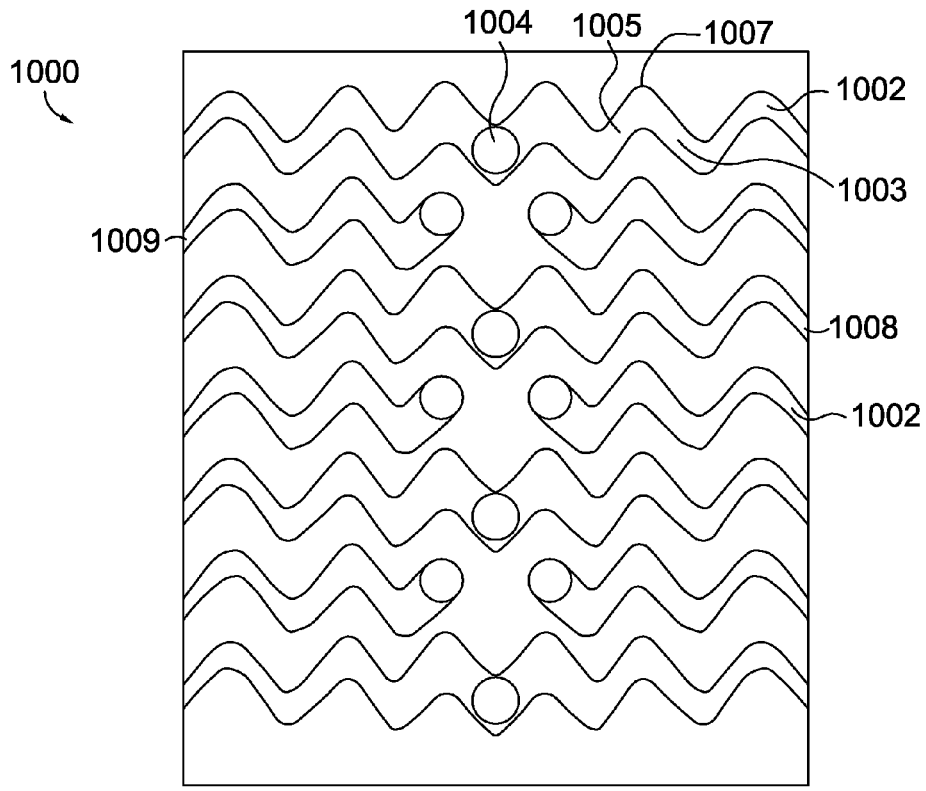
FIGS. 10A, 10B, and 10C are cut views of alternate cooling channel designs, in accordance with embodiments of the present invention.
Figure 10B:
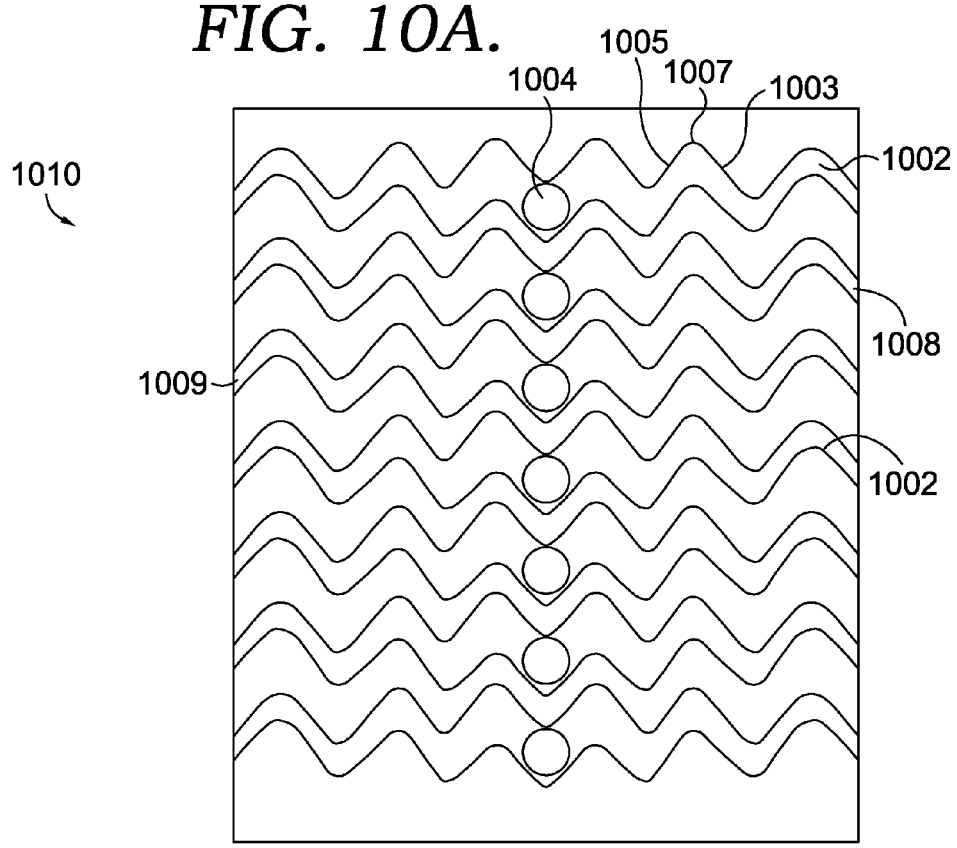
Figure 10C:
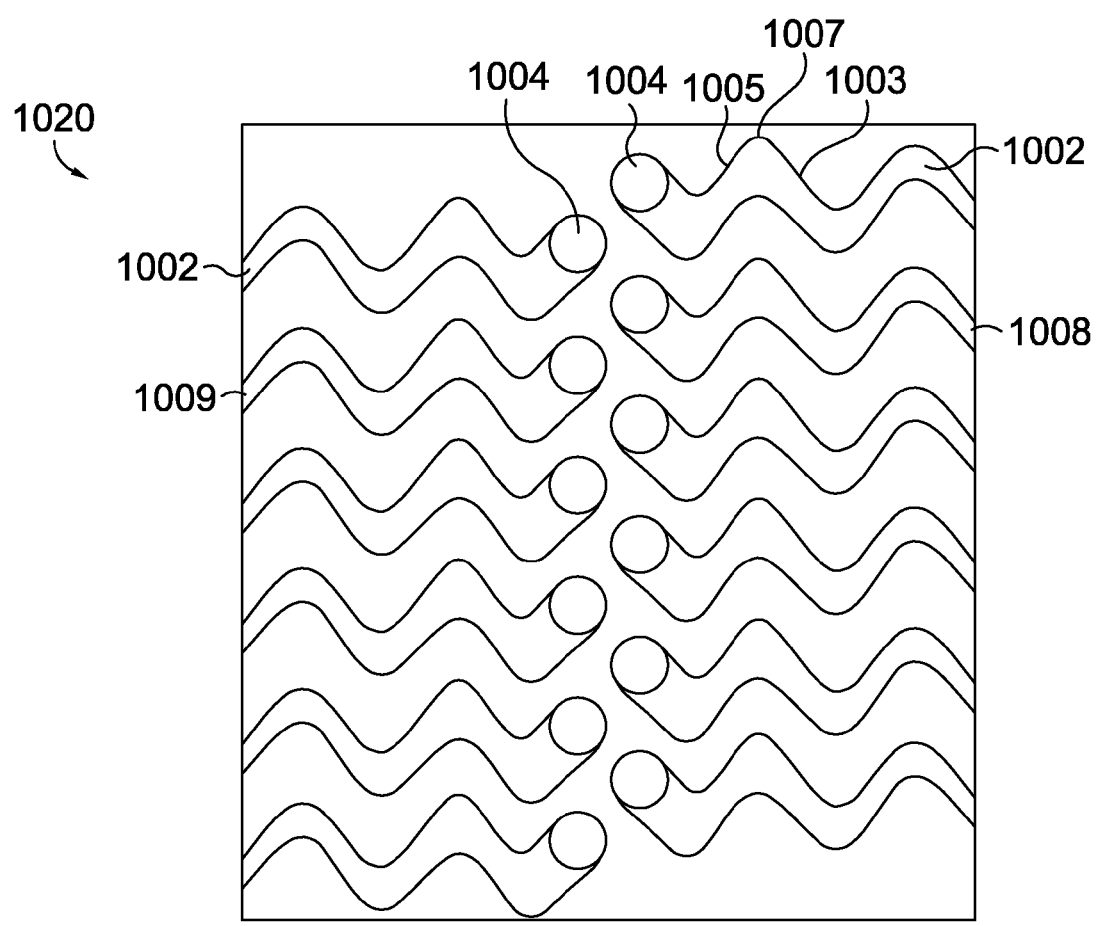

Referring now to FIGS. 10A-10C, alternate arrangements 1000, 1010, and 1020 of exemplary airfoil passages are depicted, in accordance with embodiments of the present invention. The arrangements 1000, 1010, and 1020 generally comprise different embodiments of a wave-like channel 1002, which may be incorporated into a leading edge region of an airfoil. The wave-like channel 1002, as shown in FIGS. 10A-10C, may comprise a first portion 1003 at a first angle, a second portion 1005 at a second angle, and a rounded transitional portion 1007 which connects the first and the second portions 1003, 1005. This rounded transitional portion 1007 creates the rounded "hill and valley" design effect shown in FIGS. 10A-10C. Such a pattern may be repeated throughout the wave-like channels 1002. In operation, cooling fluid or gas may be provided to the plurality of channels 1002 through impingement holes 1004. As with prior designs, the channels 1002 may decrease in cross-sectional area from the respective impingement holes 1004 to respective first and second openings 1008, 1009.

Figure 11:
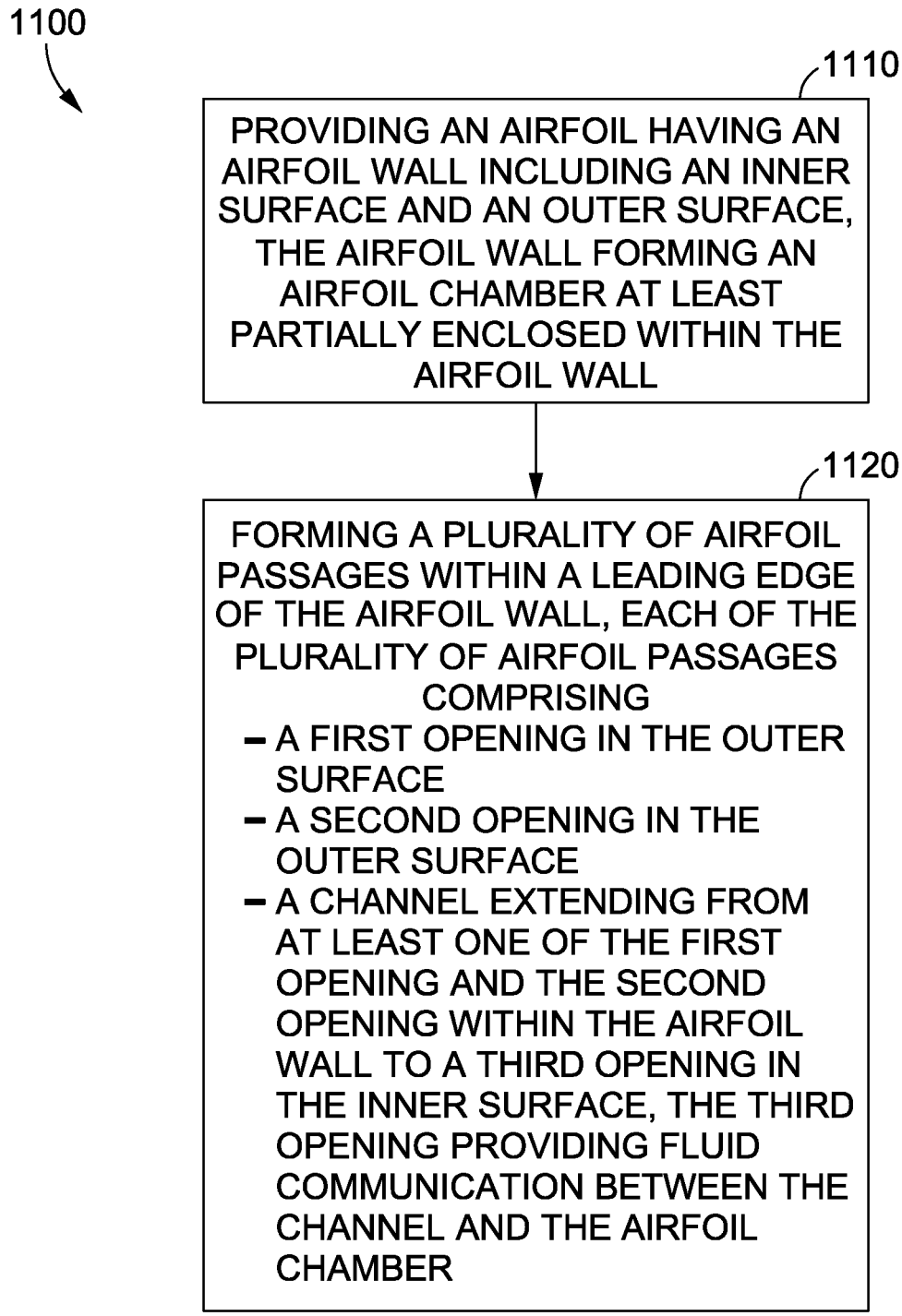
FIG. 11 is a block diagram of an exemplary method of manufacturing gas turbine airfoils, in accordance with an embodiment of the present invention.

Referring now to FIG. 11, a block diagram of an exemplary method 1100 of manufacturing airfoils is provided, in accordance with an embodiment of the present invention. At block 1110, an airfoil, such as the airfoil 500 depicted in FIG. 5A, is provided. The airfoil comprises an airfoil wall, such as the airfoil wall 501 shown in FIG. 5A, including an inner surface, such as the inner surface 503 shown in FIG. 5A, and an outer surface, such as the outer surface 505 shown in FIG. 5A, the airfoil wall forming an airfoil chamber, such as the airfoil chamber 507 shown in FIG. 5A, at least partially enclosed within the airfoil wall.

At block 1120, a plurality of airfoil passages, such as the leading edge airfoil passage 504 shown in FIG. 5A, are formed at a leading edge, such as the leading edge 502 of the airfoil 500 shown in FIG. 5A, of the airfoil wall. As discussed herein, each of the plurality of airfoil passages comprises a first opening, such as the first opening 512 shown in FIG. 5A, in the outer surface, a second opening, such as the second opening 514 shown in FIG. 5A, in the outer surface, and a channel, such as the channel 518 shown in FIG. 5A, extending from at least one of the first opening and the second opening to a third opening, such as the third opening 516 shown in FIG. 5A, the third opening providing fluid communication between the channel and the airfoil chamber.

The plurality of airfoil passages may be formed using additive manufacturing, such as selective laser melting (SLM), or another method. The first opening may include a first cross-sectional area and the second opening may include a second cross-sectional area, the first cross-sectional area being larger than the second cross sectional area.

Figure 12:
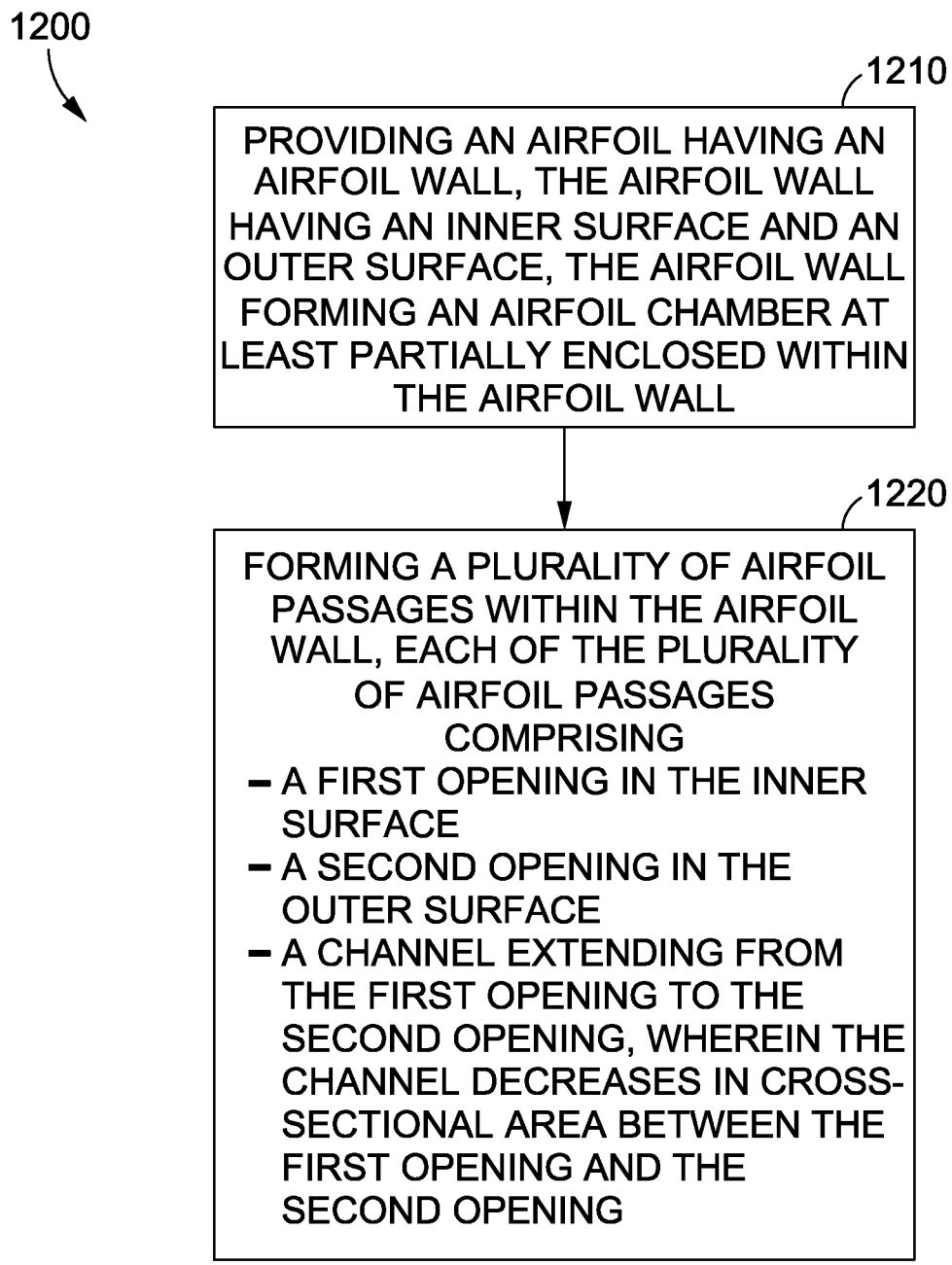
FIG. 12 is a block diagram of an exemplary method of manufacturing gas turbine airfoils, in accordance with an embodiment of the present invention.

Referring now to FIG. 12, a block diagram of another exemplary method 1200 of manufacturing airfoils is provided, in accordance with an embodiment of the present invention. At block 1210, an airfoil, such as the airfoil 500 depicted in FIG. 5A, is provided. The airfoil comprises an inner surface, such as the inner surface 503 shown in FIG. 5A, and an outer surface, such as the outer surface 505 shown in FIG. 5A, such that the airfoil wall forms an airfoil chamber, such as the airfoil chamber 507 shown in FIG. 5A, at least partially enclosed within the airfoil wall. At block 1220, a plurality of airfoil passages, such as the airfoil passages 510 shown in FIG. 5A, are formed within the airfoil wall. Each of the airfoil passages comprises at least one first opening, such as the first opening 512 shown in FIG. 5A, in the inner surface, at least one second opening, such as the second opening 514 shown in FIG. 5A, in the outer surface, and a channel, such as the channel 518 shown in FIG. 5A, extending from the first opening to the second opening. The channel decreases in cross-sectional area between the at least one first opening and the at least one second opening. The plurality of airfoil passages may be formed at least partially in a leading edge wall of the airfoil, and/or at least partially on a pressure side wall and a suction side wall of the airfoil.

Figure 13:
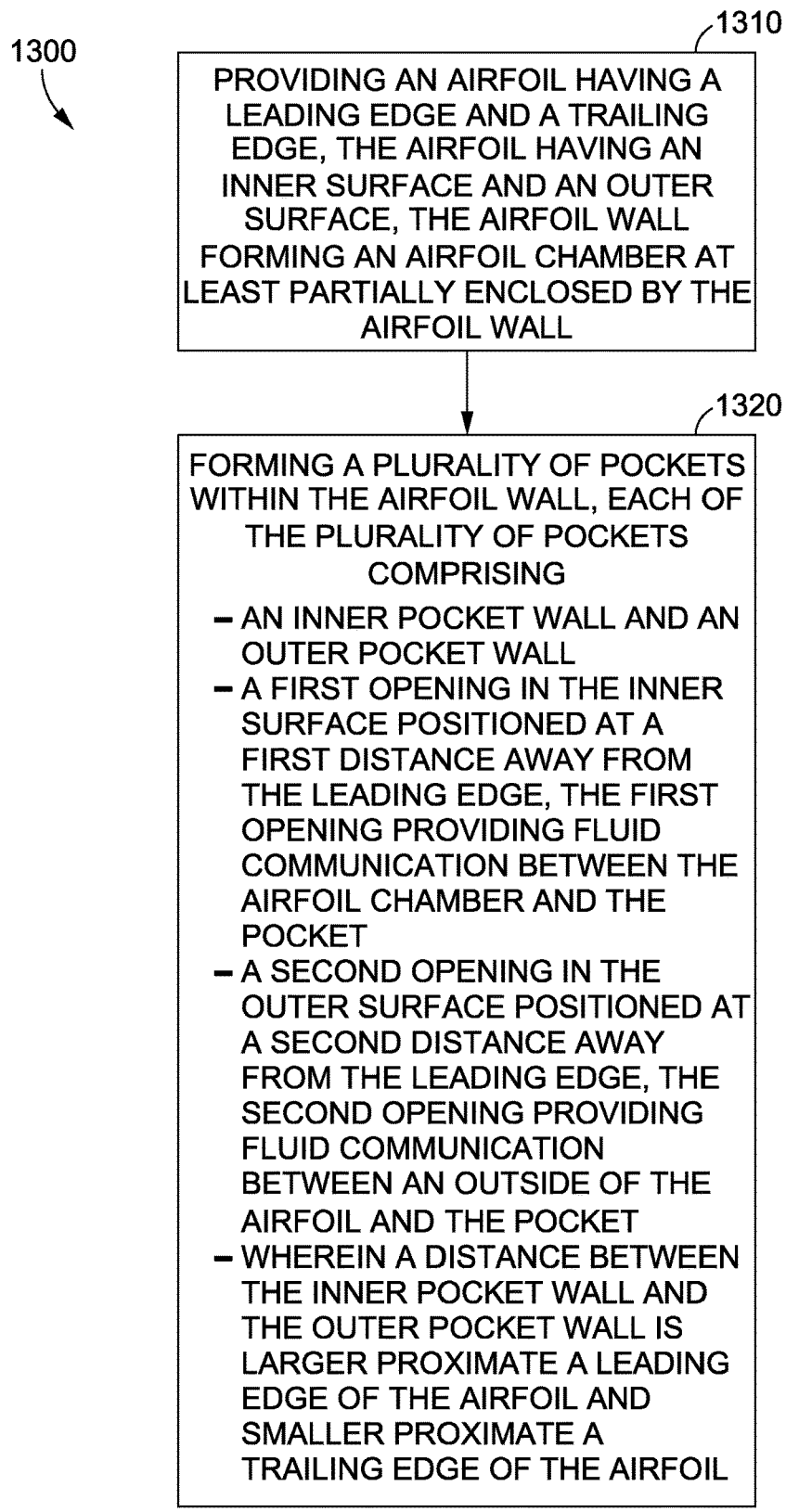
FIG. 13 is a block diagram of an exemplary method of manufacturing gas turbine airfoils, in accordance with an embodiment of the present invention.

Referring now to FIG. 13, a block diagram of another exemplary method 1300 of manufacturing airfoils is provided, in accordance with an embodiment of the present invention. At block 1310, an airfoil, such as the airfoil 500 shown in FIG. 5A, having a leading edge, such as the leading edge 502 shown in FIG. 5A, and a trailing edge, such as the trailing edge 404 shown in FIG. 4A, is provided. The airfoil comprises an airfoil wall, such as the airfoil wall 501 shown in FIG. 5A, having an inner surface, such as the inner surface 503 shown in FIG. 5A, and an outer surface, such as the outer surface 505 shown in FIG. 5A, the airfoil wall forming an airfoil chamber, such as the airfoil chamber 507 shown in FIG. 5A, at least partially enclosed by the airfoil wall.

At block 1320, a plurality of pockets, such as the pockets 310, 312, 314, and 316 shown in FIG. 3A, are formed within the airfoil wall. Each of the plurality of pockets comprises an inner pocket wall, such as the inner pocket wall 324 shown in FIG. 3A, and an outer pocket wall, such as the outer pocket wall 326 shown in FIG. 3A. Additionally, a first opening, such as the first opening 318 shown in FIG. 3A, may be positioned in the inner surface at a first distance away from the leading edge, the first opening providing fluid communication between the airfoil chamber and the pocket, and a second opening, such as the second opening 320 shown in FIG. 3A, may be positioned at a second distance away from the leading edge, the second opening providing fluid communication between an outside of the airfoil and the pocket. Further, a distance between the inner pocket wall and the outer pocket wall is larger proximate the leading edge of the airfoil and smaller approximate the trailing edge of the airfoil.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense. Additional objects, advantages, and novel features of the invention will be set forth in part in the description which follows, and in part will become apparent to those skilled in the art upon examination of the following, or may be learned by practice of the invention.

What is claimed is:

1. An airfoil for a gas turbine having a leading edge and a trailing edge, the airfoil comprising:
    an airfoil wall having a pressure side wall and a suction side wall, wherein the pressure side wall has a pressure side inner surface and a pressure side outer surface, wherein the suction side wall has a suction side inner surface and a suction side outer surface, wherein the pressure side outer surface and the suction side outer surface together define an airfoil wall outer surface, wherein the pressure side inner surface and the suction side inner surface together define an airfoil wall inner surface, and wherein the airfoil wall forms an airfoil chamber at least partially enclosed by the airfoil wall inner surface; and
    a plurality of airfoil passages formed at the leading edge and extending to the suction side wall and the pressure side wall, each of the plurality of airfoil passages comprising:
    a first opening in the pressure side outer surface,
    a second opening in the suction side outer surface, and
    a channel extending from the first opening and the second opening to a third opening in the airfoil wall inner surface, the channel tapering in at least one of a radial direction and an axial direction such that a first cross-sectional area of the first opening and a second cross-sectional area of the second opening is smaller than a third cross-sectional area of the channel at the third opening, wherein the third opening provides fluid communication between the channel and the airfoil chamber, and wherein the channel is a wave-like shape.

2. The airfoil of claim 1, wherein a ratio of the third cross-sectional area to at least one of the first cross-sectional area and the second cross-sectional area is between 1.1:1 and 10:1.

3. The airfoil of claim 1, wherein for each of the plurality of airfoil passages, the channel tapers in both the radial direction and the axial direction.

4. The airfoil of claim 1, wherein each of the plurality of airfoil passages has rounded corners.

5. The airfoil of claim 1, wherein each of the plurality of airfoil passages has sharp-edged corners.

6. The airfoil of claim 1, wherein the third opening is located adjacent a calculated leading edge stagnation point.

7. The airfoil of claim 1, wherein the plurality of airfoil passages are formed using additive manufacturing.

8. A gas turbine assembly, the assembly comprising:
    a plurality of airfoils, wherein each of the plurality of airfoils comprises:
    an airfoil wall having a pressure side wall and a suction side wall, wherein the pressure side wall has a pressure side inner surface and a pressure side outer surface, wherein the suction side wall has a suction side inner surface and a suction side outer surface, wherein the pressure side outer surface and the suction side outer surface together define an airfoil wall outer surface, wherein the pressure side inner surface and the suction side inner surface together define an airfoil wall inner surface, and wherein the airfoil wall forms an airfoil chamber at least partially enclosed by the airfoil wall inner surface; and
    an airfoil passage formed in a leading edge of the airfoil wall and extending to the pressure side wall and the suction side wall, wherein the airfoil passage comprises:
    a first opening in the pressure side outer surface,
    a second opening in the suction side outer surface, and
    a channel extending from the first opening and the second opening to a third opening in the airfoil wall inner surface, the channel tapering in at least one of a radial direction and an axial direction such that a first cross-sectional area of the first opening and a second cross-sectional area of the second opening is smaller than a third cross-sectional area of the channel at the third opening, wherein the third opening provides fluid communication between the channel and the airfoil chamber, and wherein the channel is a wave-like shape.

9. The assembly of claim 8, wherein the airfoil passage further comprises a plurality of flow turbulators.

10. The assembly of claim 9, wherein the plurality of flow turbulators are arrayed in a linear or a non-linear pattern along a length of the airfoil passage.

11. The assembly of claim 8, wherein the airfoil passage internal equivalent surface roughness is at least 400 microinches.

12. The assembly of claim 8, wherein a ratio of the third cross-sectional area to the first cross-sectional area and the second cross-sectional area is between 1.1:1 and 10:1.

13. A method of manufacturing airfoils, the method comprising:

providing an airfoil having an airfoil wall comprising a pressure side wall and a suction side wall, wherein the pressure side wall includes a pressure side inner surface and a pressure side outer surface, wherein the suction side wall includes a suction side inner surface and a suction side outer surface, wherein the pressure side outer surface and the suction side outer surface together define an airfoil wall outer surface, wherein the pressure side inner surface and the suction side inner surface together define an airfoil wall inner surface, and wherein the airfoil wall forms an airfoil chamber at least partially enclosed by the airfoil wall inner surface; and forming a plurality of airfoil passages within a leading edge of the airfoil wall and extending to the pressure side wall and the suction side wall, each of the plurality of airfoil passages comprising:

a first opening in the pressure side outer surface, a second opening in the suction side outer surface, and a channel extending from the first opening and the second opening to a third opening in the airfoil wall inner surface, the channel tapering in at least one of a radial direction and an axial direction such that a first cross-sectional area of the first opening and a second cross-sectional area of the second opening is smaller than a third cross-sectional area of the channel at the third opening, wherein the third opening provides fluid communication between the channel and the airfoil chamber, and wherein the channel is a wave-like shape.

14. The method of claim 13, wherein the plurality of airfoil passages are formed using additive manufacturing.

* * * * *